United States Patent
Ren et al.

(10) Patent No.: US 12,167,351 B2
(45) Date of Patent: Dec. 10, 2024

(54) METHOD FOR SENDING AND RECEIVING SIGNAL, TERMINAL AND APPARATUS

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 363 days.

(21) Appl. No.: 17/631,623

(22) PCT Filed: Jun. 30, 2020

(86) PCT No.: PCT/CN2020/099335
§ 371 (c)(1),
(2) Date: Jan. 31, 2022

(87) PCT Pub. No.: WO2021/017729
PCT Pub. Date: Feb. 4, 2021

(65) Prior Publication Data
US 2022/0295425 A1    Sep. 15, 2022

(30) Foreign Application Priority Data
Aug. 1, 2019  (CN) .......................... 201910708865.6

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04L 27/2607* (2013.01);
(Continued)

(58) Field of Classification Search
CPC ............... H04W 56/001; H04W 52/52; H04W 72/0446; H04W 92/18; H04L 5/0051; H04L 27/2607; H04L 27/2613; H04L 27/2636
(Continued)

(56) References Cited

U.S. PATENT DOCUMENTS 9,893,925 B1    2/2018  Patel
2018/0198659 A1  7/2018  Ko et al.
(Continued)

FOREIGN PATENT DOCUMENTS

CN    104767594 A    7/2015
CN    104936166 A    9/2015
(Continued)

OTHER PUBLICATIONS

"Kim, Youngtae, Method for Allocating Resources for Relay Node in Next Generation Communication System, and Device Therefor, May 8, 2020, WO 2020105833" (Year: 2019).*
(Continued)

*Primary Examiner* — Sai Ming Chan
(74) *Attorney, Agent, or Firm* — Harness, Dickey & Pierce, P.L.C.

(57) ABSTRACT

This disclosure provides a method for sending and receiving a signal, a terminal, an apparatus and a storage medium. The method includes: a sending side sending a synchronization signal block, wherein the synchronization signal block includes a primary synchronization signal, a secondary synchronization signal and a physical broadcast channel, the primary synchronization signal occupying two OFDM symbols, and the secondary synchronization signal occupying two OFDM symbols, wherein a synchronization signal block pattern used in a slot where the synchronization signal block is located is a first synchronization signal block
(Continued)

pattern when a normal CP is configured, and is a second synchronization signal block pattern different from the first synchronization signal block pattern when an extended CP is configured. A receiving side demodulates the synchronization signal block.

16 Claims, 12 Drawing Sheets

(51) Int. Cl.
  *H04L 27/26* (2006.01)
  *H04W 52/52* (2009.01)
  *H04W 72/0446* (2023.01)
  *H04W 92/18* (2009.01)
(52) U.S. Cl.
  CPC ...... *H04L 27/2613* (2013.01); *H04L 27/2636* (2013.01); *H04W 52/52* (2013.01); *H04W 72/0446* (2013.01); *H04W 92/18* (2013.01)
(58) Field of Classification Search
  USPC .......................................................... 370/503
  See application file for complete search history.

(56) References Cited

U.S. PATENT DOCUMENTS

| | | | |
|---|---|---|---|
| 2018/0213494 | A1 | 7/2018 | Lu et al. |
| 2019/0149383 | A1 | 5/2019 | Ko et al. |
| 2019/0159203 | A1 | 5/2019 | Kim et al. |
| 2019/0208550 | A1 | 7/2019 | Ko et al. |
| 2019/0327041 | A1 | 10/2019 | Gou et al. |
| 2020/0163052 | A1 | 5/2020 | Ko et al. |
| 2020/0396708 | A1* | 12/2020 | Bharadwaj ........ H04W 56/0015 |
| 2021/0092696 | A1 | 3/2021 | Ko et al. |
| 2021/0203429 | A1* | 7/2021 | Lin ...................... H04J 11/0076 |

FOREIGN PATENT DOCUMENTS

| | | |
|---|---|---|
| CN | 106411445 A | 2/2017 |
| CN | 107634925 A | 1/2018 |
| CN | 109495413 A | 3/2019 |
| CN | 109565830 A | 4/2019 |
| CN | 109588062 A | 4/2019 |
| CN | 110035028 A | 7/2019 |
| CN | 110050506 A | 7/2019 |
| WO | WO-2019/022574 A1 | 1/2019 |

OTHER PUBLICATIONS

Chinese Office Action dated Jun. 30, 2021 for Application No. 201910708865.6.

Huang Chenheng, Review of Physical Layer Key Technology of 3GPP 5G NR, Guangdong Planning and Designing Institute of Telecommunication Co., Ltd., Guangzhou China, Jul. 31, 2018.

CATT, "Feature lead summary on AI 7.2.4.1.3 SL Synchronization", Agenda Item 7.2.4.1.3, 3GPP TSG-RAN WG1 Meeting #96, R1-1903811, Feb. 25-Mar. 1, 2019, Athens, Greece.

CATT, "Design on synchronization mechanism for NR V2X Sidelink", Agenda Item 7.2.4.1.3, 3GPP TSG-RAN WG1 Meeting #95, R1-1812619, Nov. 12-16, 2018, Spokane, USA.

Written Opinion and International Search Report for PCT/CN2020/099335 dated Feb. 1, 2022.

Taiwanese Office Action dated May 4, 2021 for Patent application No. 109123290.

CATT, "Offline summary on AI 7.2.4.1.3 Synchronization mechanism", Agenda Item 7.2.4.1.3, 3GPP TSG-RAN1 Meeting #95, R1-1814147, Nov. 12-16, 2018, Spokane, USA.

LG Electronics, "Discussion on synchronization mechanism for NR V2X", Agenda item 7.2.4.1.3, 3GPP TSG-RAN WG1 #96 Meeting, R1-1901932, Feb. 25-Mar. 1, 2019, Athens, Greece.

Ericsson, "On Details of S-SSB design", Agenda Item 7.2.4.8, 3GPP TSG-RAN WG1 Meeting #96bis, R1-1905354, Apr. 8-12, 2019, Xi'an, China.

CATT, "On design and evaluation of S-SSB for NR V2X Sidelink", Agenda Item 7.2.4.3, 3GPP TSG-RAN WG1 Meeting #96bis, R1-1905503, Apr. 8-12, 2019, Xi'an, China.

Extended European Search Report dated Aug. 25, 2022 for EP Application No. 20 84 8671.2.

Nokia, Nokia Shanghai Bell, "Discussion on NR V2X Sidelink Synchronization", Agenda Item 7.2.4.1.3, 3GPP TSG-RAN WG1 Ad-Hoc Meeting #1901, R1-1901157, Taipei, Taiwan, Jan. 21-25, 2019.

* cited by examiner

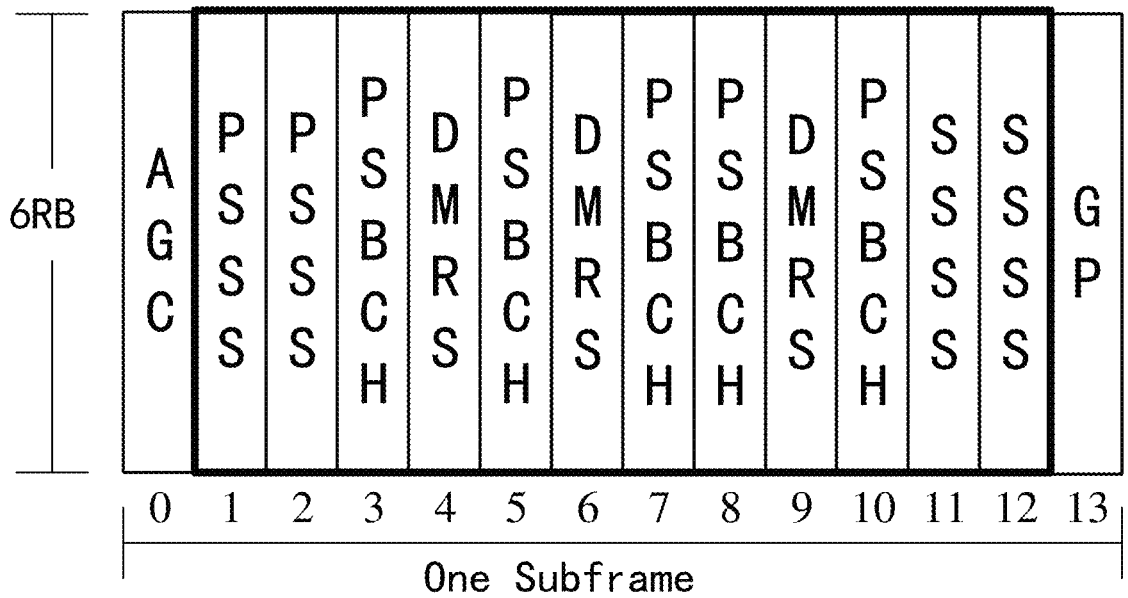

Fig. 1 sending an SSB, wherein the SSB includes a PSS, an SSS and a PBCH, the PSS occupying two OFDM symbols, and the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern ⟋ 201

Fig. 2

METHOD FOR SENDING AND RECEIVING SIGNAL, TERMINAL AND APPARATUS

CROSS-REFERENCE TO RELATED APPLICATIONS

This application is a U.S national phase application of a PCT Application No. PCT/CN2020/099335 filed on Jun. 30, 2020, which claims a priority to Chinese patent application No. 201910708865.6 filed in China on Aug. 1, 2019, disclosures of which are incorporated herein by reference in entireties.

CROSS-REFERENCE TO RELATED APPLICATION

This application claims a priority to Chinese patent application No. 201910708865.6 filed in China on Aug. 1, 2019, which is incorporated herein by reference in its entirety.

TECHNICAL FIELD

The present disclosure relates to the field of wireless communication technology, in particular to a method for sending a signal, a method for receiving a signal, a terminal, an apparatus and a storage medium.

BACKGROUND

Before user equipment (UE) is ready to perform service transmission on a sidelink, synchronization on the sidelink should be attained first. In order to expand the coverage of synchronization signals, time-domain repetition of primary sidelink synchronization signal/secondary sidelink synchronization signal (PSSS/SSSS) needs to be performed to enhance the detection performance of the synchronization signals.

FIG. 1 is a schematic structural diagram of R14 V2X sidelink synchronization broadcast information. In the R14 (Release 14) synchronization broadcast information as shown in the figure, the horizontal coordinate denotes the time domain, and each column represents one Orthogonal Frequency Division Multiplexing (OFDM) symbol. The vertical coordinate denotes the frequency domain, and includes 6 resource elements (RBs) in the figure. One slot contains one synchronization signal and PBCH block (SSB), and one SSB includes a primary sidelink synchronization signal (PSSS), a secondary sidelink synchronization signal (SSSS), a physical sidelink broadcast channel (PSBCH) signal, and a necessary demodulation reference signal (DMRS).

In an LTE (Long Term Evolution) V2X (Vehicle to Everything) system, the coverage radius required by the proximity communication port 5 (PC5) is only 300 meters, the subcarrier spacing of LTE is 15 KHz and corresponding normal cyclic prefix (CP) length is 4.7 microseconds. Therefore, supporting the LTE normal CP length can meet the system coverage requirement.

The disadvantage of the related art is that in NR radio access (NR) V2X, the coverage radius that can be supported by the LTE normal CP length does not meet the requirements.

SUMMARY

The present disclosure provides a method for sending, receiving a signal, a terminal, an apparatus and a storage medium, to solve the problem that the coverage radius supported by the LTE normal CP length cannot meet the requirements of NR V2X.

An embodiment of the present disclosure provides a method for sending a signal. The method includes: sending an SSB, wherein the SSB includes a PSS, an SSS and a PBCH, the PSS occupying two OFDM symbols, and the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern.

In an implementation, that the first SSB pattern is different from the second SSB pattern refers to that:
the PBCH in the SSB occupies M OFDM symbols when the SSB is sent by using the extended CP; or,
the PBCH in the SSB occupies N OFDM symbols when the SSB is sent by using the normal CP;
wherein M is not equal to N.

In an implementation, M is 6 or 7; or, N is 8 or 9.

In an implementation, two OFDM symbols in the SSB that are used for transmission of the SSS are discontinuous OFDM symbols in a time domain.

In an implementation, the SSB further includes the PBCH occupying 5 or more OFDM symbols.

In an implementation, the first OFDM symbol of the slot where the SSB is located is allocated for the PBCH, and the first OFDM symbol is used for implementing an AGC function.

In an implementation, a channel estimation is performed by using a DMRS embedded in the PBCH and PBCH decoding is performed based on a result of the channel estimation when the SSB is sent by using a CP-OFDM waveform; or,
the channel estimation is performed by using the SSS and the PBCH decoding is performed based on the result of the channel estimation when the SSB is sent by using the CP-OFDM waveform; or,
the channel estimation is performed by using the SSS and the PBCH decoding is performed based on the result of the channel estimation when the SSB is sent by using a DFT-s-OFDM waveform; or
the channel estimation is performed by using the DMRS and the PBCH decoding is performed based on the result of the channel estimation when the SSB is sent by using the DFT-s-OFDM waveform.

In an implementation, the SSB is an S-SSB, the PSS is an S-PSS, the SSS is an S-SSS, and the PBCH is a PSBCH.

An embodiment of the present disclosure provides a method for receiving a signal. The method includes: receiving an SSB, wherein the SSB includes a PSS, an SSS and a PBCH, the PSS occupying two OFDM symbols, the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern; demodulating the SSB.

In an implementation, that the first SSB pattern is different from the second SSB pattern refers to that:
the PBCH in the SSB occupies M OFDM symbols when the SSB is sent by using the extended CP; or,
the PBCH in the SSB occupies N OFDM symbols when the SSB is sent by using the normal CP;
wherein M is not equal to N.

In an implementation, M is 6 or 7; or, N is 8 or 9.

In an implementation, two OFDM symbols in the SSB that are used for transmission of the SSS are discontinuous OFDM symbols in a time domain.

In an implementation, the SSB further includes the PBCH occupying 5 or more OFDM symbols.

In an implementation, the first OFDM symbol of the slot where the SSB is located is allocated for the PBCH, and is used for implementing an AGC function.

In an implementation, a channel estimation is performed by using a DMRS embedded in the PBCH and PBCH decoding is performed based on a result of the channel estimation when the SSB is sent by using a CP-OFDM waveform; or,
    the channel estimation is performed by using the SSS and the PBCH decoding is performed based on the result of the channel estimation when the SSB is sent by using the CP-OFDM waveform; or,
the channel estimation is performed by using the SSS and the PBCH decoding is performed based on the result of the channel estimation when the SSB is sent by using a DFT-s-OFDM waveform; or
the channel estimation is performed by using the DMRS and the PBCH decoding is performed based on the result of the channel estimation when the SSB is sent by using the DFT-s-OFDM waveform.

In an implementation, the SSB is an S-SSB, the PSS is an S-PSS, the SSS is an S-SSS, and the PBCH is a PSBCH.

An embodiment of the present disclosure provides a terminal, including:
  a processor, configured to read a program in a memory and execute following process:
  sending an SSB, wherein the SSB includes a PSS, an SSS and a PBCH, the PSS occupying two OFDM symbols, the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern;
  a transceiver, configured to receive and send data under the control of the processor.

In an implementation, that the first SSB pattern is different from the second SSB pattern refers to that:
  the PBCH in the SSB occupies M OFDM symbols when the SSB is sent by using the extended CP; or,
  the PBCH in the SSB occupies N OFDM symbols when the SSB is sent by using the normal CP;
  wherein M is not equal to N.

In an implementation, M is 6 or 7; or, N is 8 or 9.

In an implementation, two OFDM symbols in the SSB that are used for transmission of the SSS are discontinuous OFDM symbols in a time domain.

In an implementation, the SSB further includes the PBCH occupying 5 or more OFDM symbols.

In an implementation, the first OFDM symbol of the slot where the SSB is located is allocated for the PBCH, and is used for implementing an AGC function.

In an implementation, a channel estimation is performed by using a DMRS embedded in the PBCH and PBCH decoding is performed based on a result of the channel estimation when the SSB is sent by using a CP-OFDM waveform; or,
  the channel estimation is performed by using the SSS and the PBCH decoding is performed based on the result of the channel estimation when the SSB is sent by using the CP-OFDM waveform; or,
  the channel estimation is performed by using the SSS and the PBCH decoding is performed based on the result of the channel estimation when the SSB is sent by using a DFT-s-OFDM waveform; or
  the channel estimation is performed by using the DMRS and the PBCH decoding is performed based on the result of the channel estimation when the SSB is sent by using the DFT-s-OFDM waveform.

In an implementation, the SSB is an S-SSB, the PSS is an S-PSS, the SSS is an S-SSS, and the PBCH is a PSBCH.

An embodiment of the present disclosure provides a terminal, including:
  a processor, configured to read a program in a memory and execute following process:
  demodulating an SSB;
  a transceiver, configured to receive and send data under the control of the processor and execute following process:
  receiving the SSB, wherein the SSB includes a PSS, an SSS and a PBCH, the PSS occupying two OFDM symbols, the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern.

In an implementation, that the first SSB pattern is different from the second SSB pattern refers to that:
  the PBCH in the SSB occupies M OFDM symbols when the SSB is sent by using the extended CP; or,
  the PBCH in the SSB occupies N OFDM symbols when the SSB is sent by using the normal CP;
  wherein M is not equal to N.

In an implementation, M is 6 or 7; or, N is 8 or 9.

In an implementation, two OFDM symbols in the SSB that are used for transmission of the SSS are discontinuous OFDM symbols in a time domain.

In an implementation, the SSB further includes the PBCH occupying 5 or more OFDM symbols.

In an implementation, the first OFDM symbol of the slot where the SSB is located is allocated for the PBCH, and is used for implementing an AGC function.

In an implementation, a channel estimation is performed by using a DMRS embedded in the PBCH and PBCH decoding is performed based on a result of the channel estimation when the SSB is sent by using a CP-OFDM waveform; or,
  the channel estimation is performed by using the SSS and the PBCH decoding is performed based on the result of the channel estimation when the SSB is sent by using the CP-OFDM waveform; or,
  the channel estimation is performed by using the SSS and the PBCH decoding is performed based on the result of the channel estimation when the SSB is sent by using a DFT-s-OFDM waveform; or
  the channel estimation is performed by using the DMRS and the PBCH decoding is performed based on the result of the channel estimation when the SSB is sent by using the DFT-s-OFDM waveform.

In an implementation, the SSB is an S-SSB, the PSS is an S-PSS, the SSS is an S-SSS, and the PBCH is a PSBCH.

An embodiment of the present disclosure provides an apparatus for sending a signal, including: a sending module, configured to send an SSB, wherein the SSB includes a PSS, an SSS and a PBCH, the PSS occupying two OFDM symbols, and the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern.

An embodiment of the present disclosure provides an apparatus for receiving a signal, including: a receiving module, configured to receive an SSB, wherein the SSB includes a PSS, an SSS and a PBCH, the PSS occupying two OFDM symbols, and the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern; a demodulation module, configured to demodulate the SSB.

An embodiment of the present disclosure provides a computer-readable storage medium storing thereon a computer program, wherein the computer program is configured to be executed by a processor to implement the above-mentioned method for sending a signal and/or method for receiving a signal.

The beneficial effects of the present disclosure are as follows: with the technical solution provided in the embodiments of the present disclosure, an SSB pattern for the situation where an extended CP is used may be utilized when the sidelink communication subcarrier spacing is large, to avoid inter-symbol crosstalk due to multipath delay, thus improving the success rate of detecting PSS and SSS sequences, and further improving the success rate of decoding the physical broadcast channel (PBCH) and ensuring that the coverage radius requirement of NR V2X is met.

BRIEF DESCRIPTION OF THE DRAWINGS

The drawings described here are used to provide a further understanding of the present disclosure and constitute a part of the present disclosure. The exemplary embodiments of the present disclosure and their descriptions are used to explain the present disclosure, and do not constitute an improper limitation on the present disclosure.

FIG. 1 is a schematic structural diagram of R14 V2X sidelink synchronization broadcast information cited in the background section;

FIG. 2 is a flowchart of an implementation of a method for sending a signal at a sending side according to an embodiment of the present disclosure;

DETAILED DESCRIPTION

Figure 3:
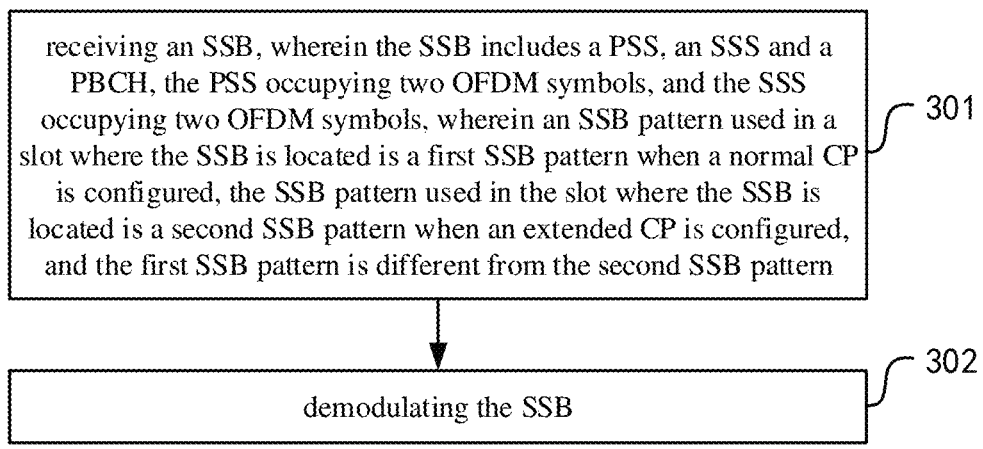
FIG. 3 is a flowchart of an implementation of a method for receiving a signal at a receiving side according to an embodiment of the present disclosure.

It is noticed during research that:

In a fifth generation (5G) NR V2X system, direct communication between terminals is carried out using the PC5 port. Before transmitting service data, it is necessary to first establish synchronization between the two terminals communicating at the PC5 port. The method of establishing synchronization is that one terminal A sends synchronization and broadcast signals, and the other terminal B receives the synchronization and broadcast signals sent by the terminal A. Once the terminal B receives and demodulates the signals successfully, the two terminals can establish synchronization and prepare for the next step of direct communication.

The synchronization signal and broadcast information of LTE V2X occupy 6 RBs in the frequency domain and are sent in a slot using 12 symbols, among them, the PSSS and the SSSS occupy 2 symbols each and the PSBCH occupies 5 symbols, and a DMRS occupying 3 symbols is used for channel estimation and PSBCH decoding.

The synchronization signal of NR UU port is carried by SSB. Each slot carries two SSBs, and there is no time domain repetition mechanism for the primary synchronization signal (PSS) and the secondary synchronization signal (SSS).

In order to complete the beam measurement and beam selection, the SSB of the NR UU port needs to undergo beam sweeping. The beam sweeping refers to that the base station sends the SSB once in each possible beam direction within a certain time interval (5 ms), and then the terminal measures the SSB signal strength of each beam and reports the measurement results to the base station. The base station selects, according to the measurement results reported by the terminal, the most suitable beam to send data to the terminal.

Based on different carrier frequencies and different subcarrier spacings, the quantity of directions on which the beam sweeping needs to be done is also different. The maximum quantities of SSB beam sweeping candidate directions in different carrier frequency ranges are: 4/8/64 respectively, and the actual quantity of configured beam sweeping directions cannot exceed the maximum quantity.

An SSB includes a PSS, an SSS and a PBCH, and the SSB pattern refers to the pattern composed of the time-frequency resources occupied by at least one signal or channel among PSS, SSS and PBCH.

When synchronous information is transmitted on NR V2X sidelink, the SSB approach also needs to be adopted. The SSB on the sidelink is called sidelink synchronization signal and PBCH block (S-SSB). In particular, the S-SSB pattern refers to the pattern composed of the time-frequency resources occupied by at least one signal or channel among sidelink primary synchronization signal (S-PSS), sidelink secondary synchronization signal (S-SSS), and physical sidelink broadcast channel (PSBCH). To reduce complexity, the sending of S-SSB may be sending an omnidirectional beam once or repetitively sending the same beam several times, instead of adopting the approach of beam sweeping.

In the LTE V2X system, since the coverage radius required by the PC5 port is only 300 meters, and the subcarrier spacing of LTE is 15 KHz, and its corresponding normal CP length is 4.7 microseconds, the system coverage requirement can be met by supporting the LTE normal CP length. Thus, the extended CP is not supported in PC5 V2X of LTE Rel-14.

However, for NR V2X, it is required to support a variety of subcarrier spacings (SCSs), including 15 KHz, 30 KHz and 60 KHz. For the subcarrier spacing of 60 KHz, the normal CP length becomes ¼ of the normal CP length for the subcarrier spacing of 15 KHz, and then the normal CP length is only 1.2 microseconds. In view of delay spread and other factors, the coverage radius that the normal CP can support cannot meet the requirement.

Therefore, it is necessary to introduce the extended CP to support the requirement of NR V2X for adequate coverage radius. The extended CP length is 16.67 microseconds at a subcarrier spacing of 15 KHz and 4.2 microseconds at a subcarrier spacing of 60 KHz, which can meet the coverage requirement of NR V2X.

In view of the above, the present disclosure provides a technical solution for sending and receiving an SSB, whereby an SSB pattern for the situation where an extended CP is used may be utilized when the sidelink communication subcarrier spacing is large, to avoid inter-symbol crosstalk due to multipath delay, thus improving the success rate of detecting PSS and SSS sequences, and further improving the success rate of decoding the physical broadcast channel (PBCH) and ensuring that the coverage radius requirement of NR V2X is met.

Specific implementations of the present disclosure are described below with reference to the drawings.

The following description will be presented separately in terms of the implementation of sending terminal and the implementation of receiving terminal that use the PC5 port for direct communication. This way of illustration does not mean that the two must be implemented in cooperation or must be implemented separately. In fact, when the sending terminal and the receiving terminal are implemented separately, they can solve problem on respective sides, and when the two are used together, better technical results are obtained.

FIG. 2 is a flowchart of an implementation of a method for sending a signal at a sending side. As shown in FIG. 2, the method includes:

step 201: sending an SSB, wherein the SSB includes a PSS, an SSS and a PBCH, the PSS occupying two OFDM symbols, and the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern.

FIG. 3 is a flowchart of an implementation of a method for receiving a signal at a receiving side. As shown in FIG. 3, the method includes:

step 301: receiving an SSB, wherein the SSB includes a PSS, an SSS and a PBCH, the PSS occupying two OFDM symbols, and the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern;

step 302: demodulating the SSB.

Specifically, the SSB pattern in the case of normal CP is different from the SSB pattern in the case of extended CP. In the SSB, two OFDM symbols are used to transmit the PSS, while two OFDM symbols are used to transmit the SSS. This scheme can be used in sidelink communication of NR V2X.

Signals propagating in space are susceptible to multipath delay. CP is provided to overcome the multipath delay, and the longer the CP, the larger multipath delay can be overcome. In this way, since the extended CP length is longer than the normal CP, larger multipath delay can be tolerated with the extended CP, so that a larger signal coverage radius can be supported with the extended CP.

Since the normal CP is shorter, it can only overcome the smaller multipath delay, so the coverage radius supported is smaller; while the extended CP is longer, it can overcome larger multipath delay and can support a larger coverage radius. Normal CP and extended CP are parameters configured before signal transmission, and the system can choose to configure the CP as normal CP or extended CP, and generally the two kinds of CPs cannot coexist.

In an implementation, at the sending side,
when the SSB is sent by using a CP-OFDM waveform, a channel estimation is performed by using a DMRS embedded in the PBCH, and PBCH decoding is performed based on a result of the channel estimation; or,
when the SSB is sent by using a CP-OFDM waveform, the channel estimation is performed by using the SSS and PBCH decoding is performed based on a result of the channel estimation; or,
when the SSB is sent by using a DFT-s-OFDM waveform, the channel estimation is performed by using the SSS and PBCH decoding is performed based on a result of the channel estimation; or
when the SSB is sent by using a DFT-s-OFDM waveform, the channel estimation is performed by using the DMRS and PBCH decoding is performed based on a result of the channel estimation.

Correspondingly, at the receiving side,
when the SSB is sent by using a CP-OFDM waveform, a channel estimation is performed by using a DMRS embedded in the PBCH, and PBCH decoding is performed based on a result of the channel estimation; or, when the SSB is sent by using a CP-OFDM waveform, the channel estimation is performed by using the SSS and PBCH decoding is performed based on a result of the channel estimation; or, when the SSB is sent by using a DFT-s-OFDM waveform, the channel estimation is performed by using the SSS and PBCH decoding is performed based on a result of the channel estimation; or when the SSB is sent by using a DFT-s-OFDM waveform, the channel estimation is performed by using the DMRS and PBCH decoding is performed based on a result of the channel estimation.

Specifically, when a cyclic prefix-orthogonal frequency division multiplexing (CP-OFDM) waveform is used, an independent demodulation reference signal (DMRS) column is not included, but the channel estimation is performed by using a DMRS embedded in the PBCH, and PSBCH decoding is performed based on a result of the channel estimation.

When a CP-OFDM or discrete Fourier transform-spread-orthogonal frequency division multiplexing (DFT-s-OFDM) waveform is used, the DMRS is not embedded in the symbol where the PSBCH is located, but the channel estimation is performed by using the SSS and PSBCH decoding is performed based on a result of the channel estimation. At this time, the two waveforms can share a single SSB pattern.

When a DFT-s-OFDM waveform is used, the channel estimation is performed by using an independent DMRS column, and PSBCH decoding is performed based on a result of the channel estimation.

In an implementation, that the first SSB pattern is different from the second SSB pattern refers to that:

when the SSB is sent by using an extended CP, the SSB includes a PBCH occupying M OFDM symbols; or, when the SSB is sent by using a normal CP, the SSB includes a PBCH occupying N OFDM symbols;

wherein M is not equal to N.

In an implementation, M is 6 or 7; or, N is 8 or 9.

Specifically, the difference between the SSB patterns for the cases of normal CP and extended CP lies in that: there is difference in the quantity of symbols occupied by PBCH; PBCH occupies 8 or 9 symbols when normal CP is used, while PBCH occupies 6 or 7 symbols when extended CP is used.

In a specific implementation, the normal CP is generally used in scenarios with shorter communication distance, such as the distance between the sending and receiving entities is less than or equal to 1 km; while the extended CP is generally used in scenarios with longer communication distance, such as the distance between the sending and receiving entities is more than or equal to 1 km.

In an implementation, two OFDM symbols in the SSB that are used for transmission of the SSS are discontinuous OFDM symbols in a time domain.

Specifically, in the SSB pattern, two discontinuous OFDM symbols are used for transmission of the SSS.

In an implementation, the SSB further includes a PBCH occupying 5 or more OFDM symbols.

Specifically, in the SSB pattern, the PBCH occupies at least 5 OFDM symbols.

In an implementation, the first OFDM symbol of the slot where the SSB is located is allocated for the PBCH, and the first OFDM symbol is used for implementing the AGC function.

Specifically, in the SSB pattern, the first symbol is allocated for the PBCH, to fulfill the AGC function.

The following description takes a possible SSB pattern as an example. In addition, in the drawings of the present disclosure, a thick black solid line box represents one SSB.

In a specific implementation, the SSB is an S-SSB, the PSS is an S-PSS, the SSS is an S-SSS, and the PBCH is a PSBCH. The following will mainly take S-PSS, S-SSS, and PSBCH as examples.

Figure 4:
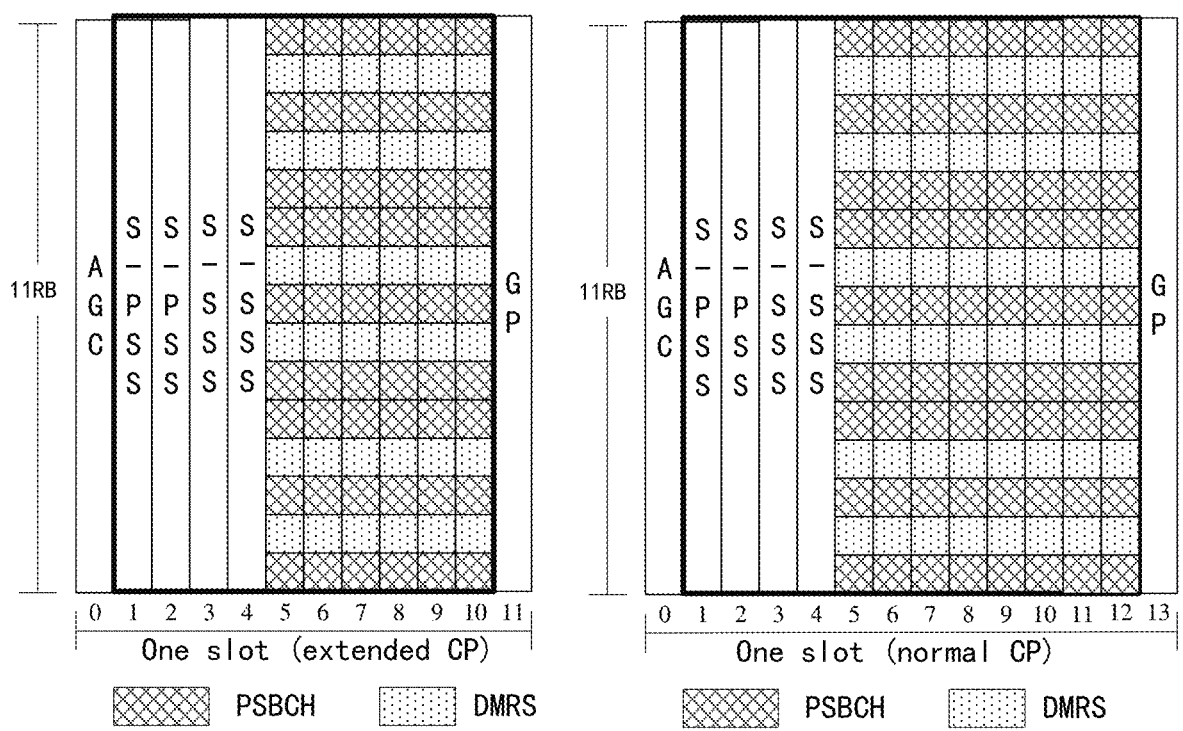
FIG. 4 is a schematic structural diagram of an S-SSB according to an embodiment of the present disclosure.

FIG. 4 is a schematic structural diagram of an S-SSB. FIG. 4 shows S-SSB patterns in the cases of extended CP and normal CP when a sidelink subcarrier spacing is 60 KHz. In the SSB pattern in the case of extended CP, S-PSS and S-SSS in each S-SSB each occupy 2 symbols, and PSBCH occupies 6 symbols. With the S-SSB pattern in the case of the extended CP, inter-symbol crosstalk due to multipath delay is avoided, thereby the success rate of detecting PSS and SSS sequences is improved, and the success rate of decoding the PSBCH is also improved and the coverage radius requirement of NR V2X is met.

The following description will be illustrated by way of example.

Embodiment 1

Figure 5:
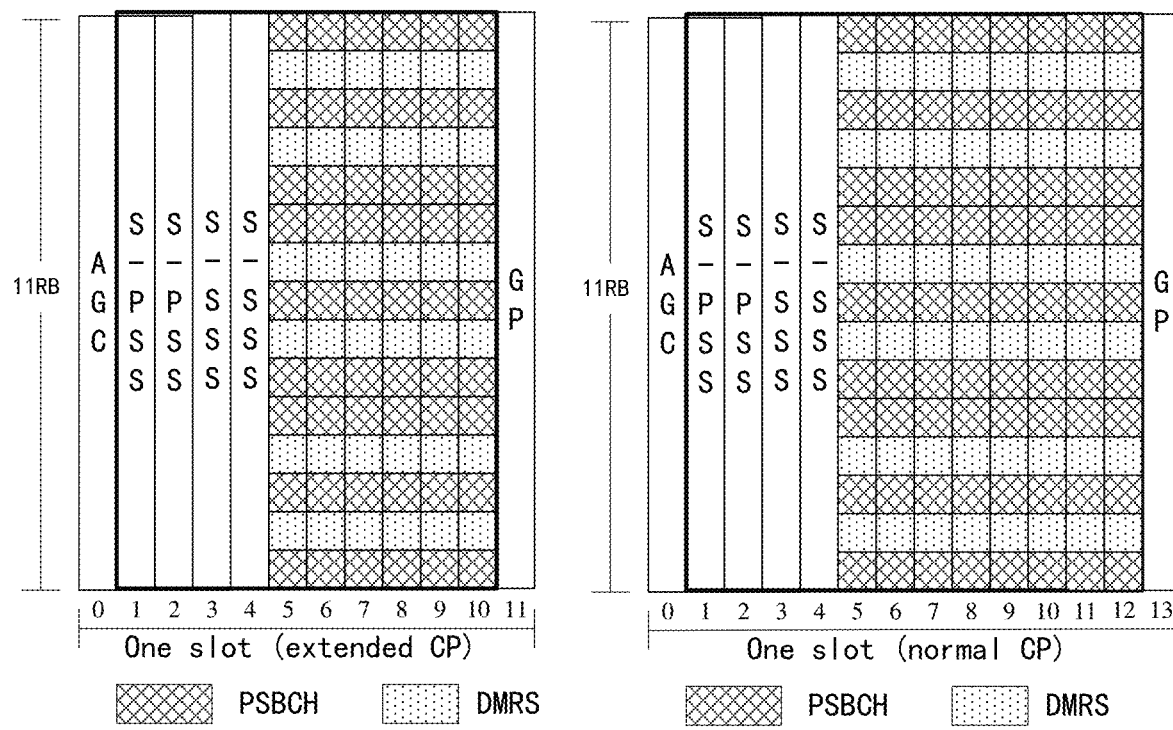
FIG. 5 is a schematic structural diagram of an S-SSB according to embodiment 1 of the disclosure.

FIG. 5 is a schematic structural diagram of an S-SSB in embodiment 1. As shown in the figure, when a CP-OFDM waveform is used, one slot configured with extended CP includes one S-SSB, and S-PSS is located in symbols #1 and #2, S-SSS is located in symbols #3 and #4, PSBCH is located in symbols #5 to #10, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols, so that the extended CP can ensure that the coverage requirement of NR V2X is met.

Embodiment 2

Figure 6:
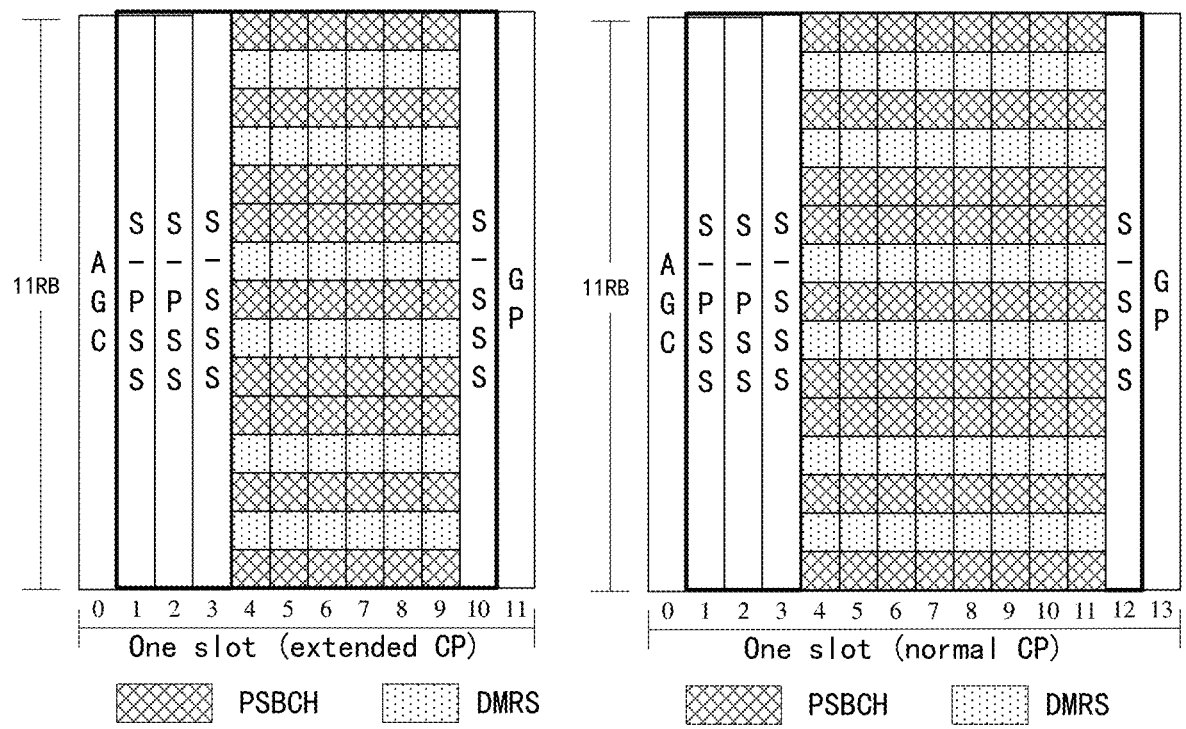
FIG. 6 is a schematic structural diagram of an S-SSB according to embodiment 2 of the disclosure.

FIG. 6 is a schematic structural diagram of an S-SSB in embodiment 2. As shown in the figure, when a CP-OFDM waveform is used, one slot configured with extended CP includes one S-SSB, and S-PSS is located in symbols #1 and #2, S-SSS is located in symbols #3 and #10, PSBCH is located in symbols #4 to #9, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols. The use of extended CP can ensure that the coverage requirement of NR V2X is met, and there are 6 symbols between two S-SSS symbols, which improves the performance of frequency offset estimation.

Embodiment 3

Figure 7:
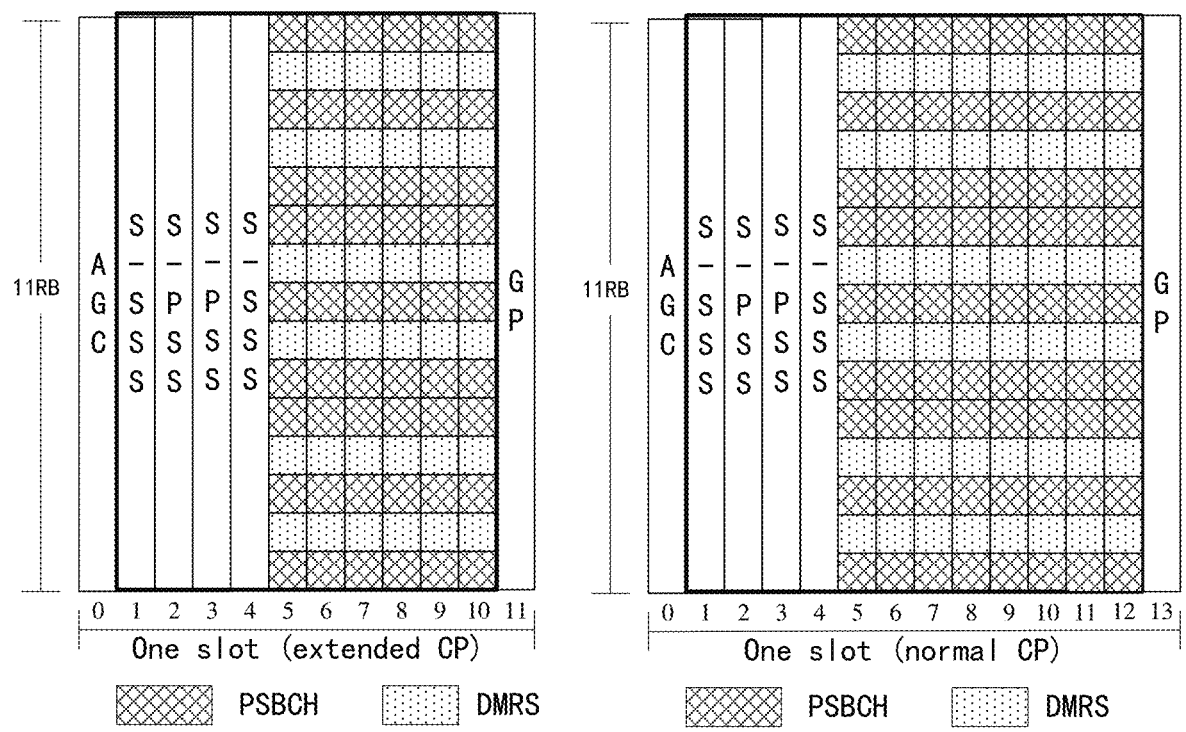
FIG. 7 is a schematic structural diagram of an S-SSB according to embodiment 3 of the disclosure.

FIG. 7 is a schematic structural diagram of an S-SSB in embodiment 3. As shown in the figure, when a CP-OFDM waveform is used, one slot configured with extended CP includes one S-SSB, and S-PSS is located in symbols #2 and #3, S-SSS is located in symbols #1 and #4, PSBCH is located in symbols #5 to #10, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols. The use of extended CP can ensure that the coverage requirement of NR V2X is met, and there are 2 symbols between two S-SSS symbols, which improves the performance of frequency offset estimation.

Embodiment 4

Figure 8:
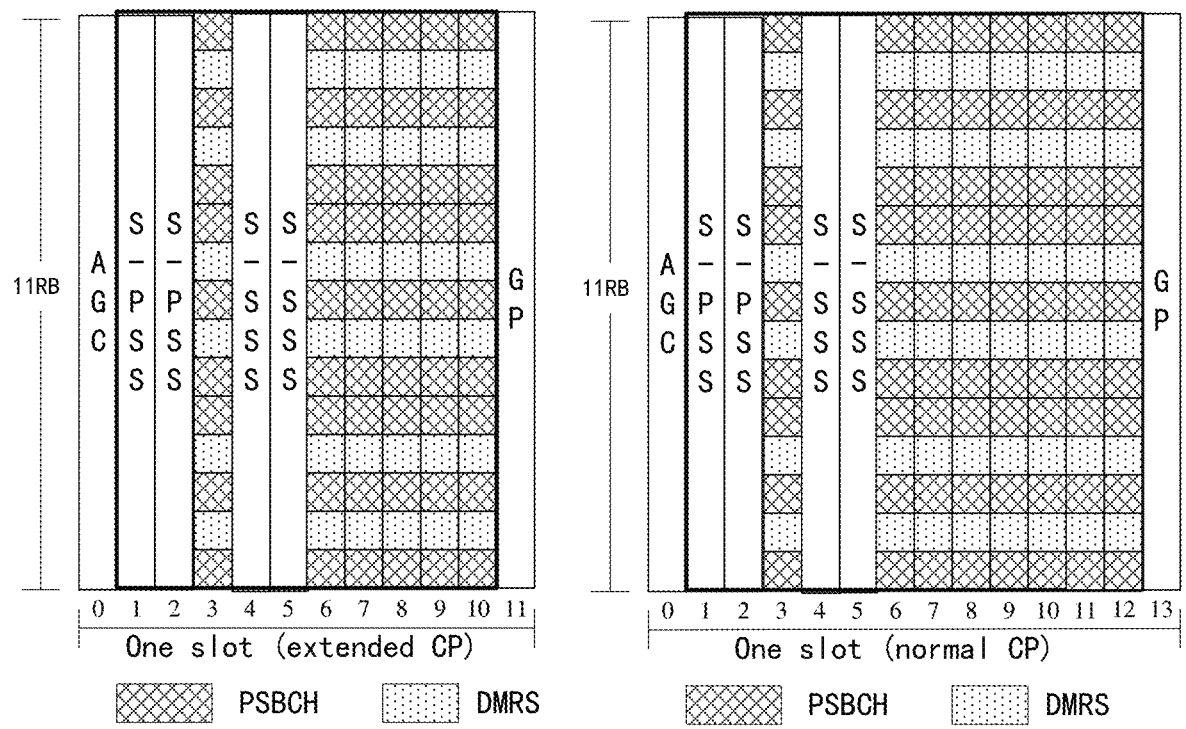
FIG. 8 is a schematic structural diagram of an S-SSB according to embodiment 4 of the disclosure.

FIG. 8 is a schematic structural diagram of an S-SSB in embodiment 4. As shown in the figure, when a CP-OFDM waveform is used, one slot configured with extended CP includes one S-SSB, and S-PSS is located in symbols #1 and #2, S-SSS is located in symbols #4 and #5, PSBCH is located in symbols #3, #6 to #10, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols. The use of extended CP can ensure that the coverage requirement of NR V2X is met, and two S-PSS symbols are followed by PSBCH, which avoids the impact of transition time on S-SSS detection.

Embodiment 5

Figure 9:
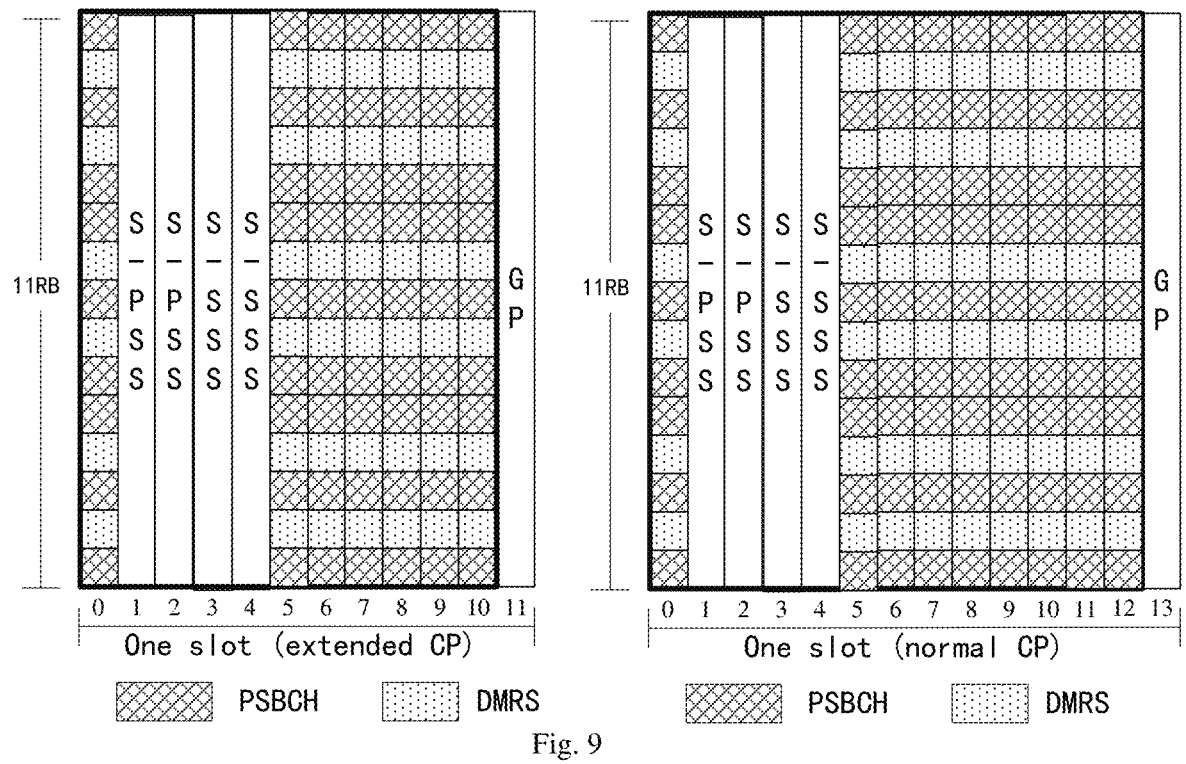
FIG. 9 is a schematic structural diagram of an S-SSB according to embodiment 5 of the present disclosure.

FIG. 9 is a schematic structural diagram of an S-SSB in embodiment 5. As shown in the figure, when a CP-OFDM waveform is used, one slot configured with extended CP includes one S-SSB, and S-PSS is located in symbols #1 and #2, S-SSS is located in symbols #3 and #4, PSBCH is located in symbols #0, #5 to #10, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols. The use of extended CP can ensure that the coverage requirement of NR V2X is met, and the PSBCH at symbol #0 serves as AGC, which reduces the code rate of PSBCH and improves the decoding performance of PSBCH.

Embodiment 6

Figure 10:
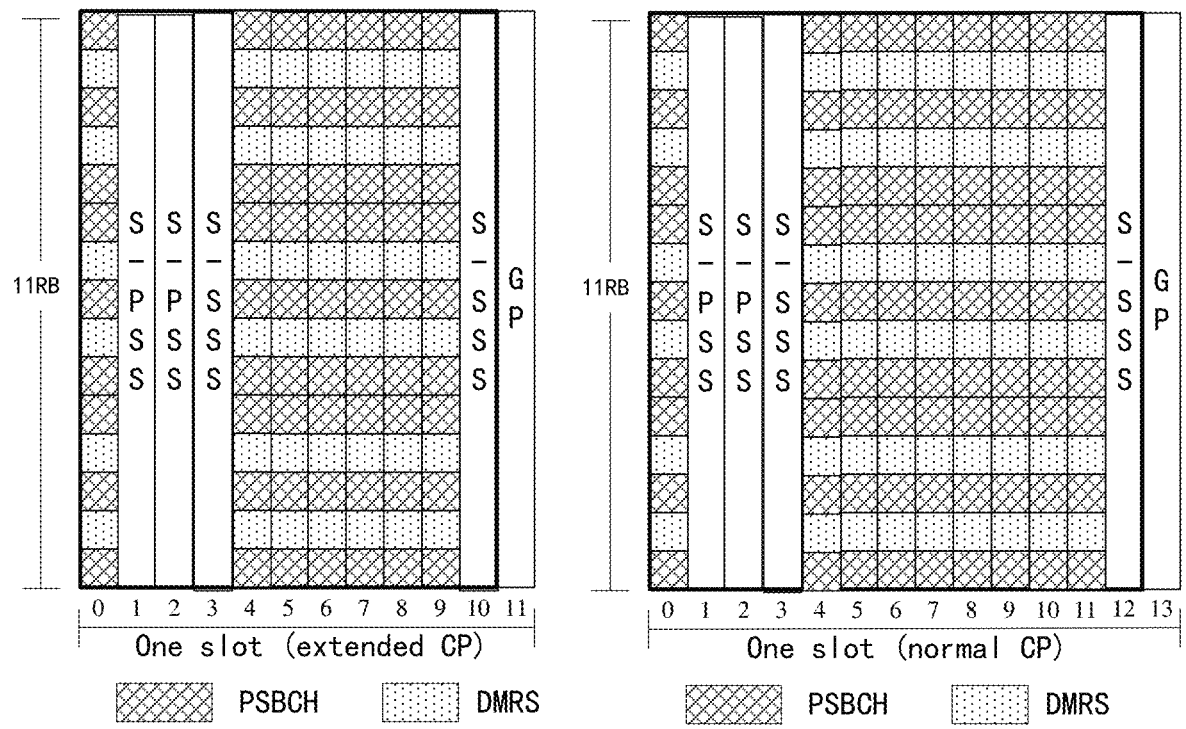
FIG. 10 is a schematic structural diagram of an S-SSB according to embodiment 6 of the disclosure.

FIG. 10 is a schematic structural diagram of an S-SSB in embodiment 6. As shown in the figure, when a CP-OFDM waveform is used, one slot configured with extended CP includes one S-SSB, and S-PSS is located in symbols #1 and #2, S-SSS is located in symbols #3 and #10, PSBCH is located in symbols #0, #4 to #9, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols. The use of extended CP can ensure that the coverage requirement of NR V2X is met, and the PSBCH at symbol #0 serves as AGC, which reduces the code rate of PSBCH and improves the decoding performance of PSBCH. Moreover, there are 6 symbols between two S-SSS symbols, which improves the performance of frequency offset estimation.

Embodiment 7

Figure 11:
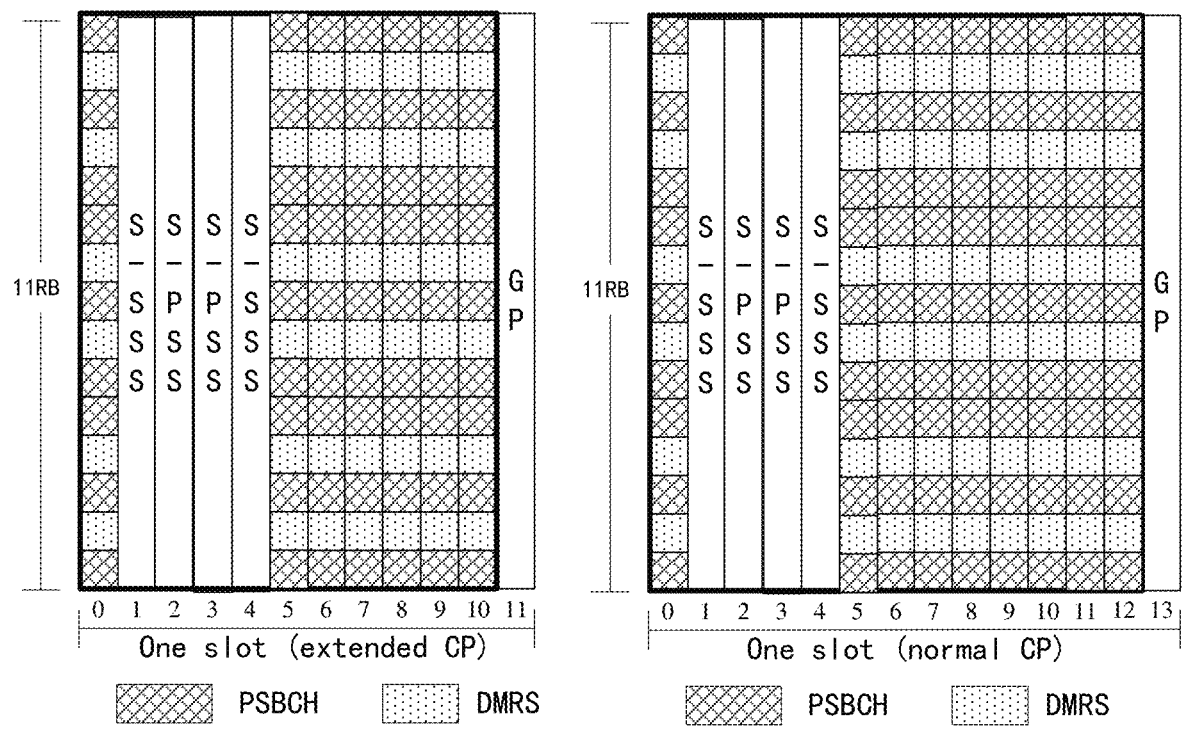
FIG. 11 is a schematic structural diagram of an S-SSB according to embodiment 7 of the disclosure.

FIG. 11 is a schematic structural diagram of an S-SSB in embodiment 7. As shown in the figure, when a CP-OFDM waveform is used, one slot configured with extended CP includes one S-SSB, and S-PSS is located in symbols #2 and #3, S-SSS is located in symbols #1 and #4, PSBCH is located in symbols #0, #5 to #10, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols. The use of extended CP can ensure that the coverage requirement of NR V2X is met, and the PSBCH at symbol #0 serves as AGC, which reduces the code rate of PSBCH and improves the decoding performance of PSBCH. Moreover, there are 2 symbols between two S-SSS symbols, which improves the performance of frequency offset estimation.

Embodiment 8

Figure 12:
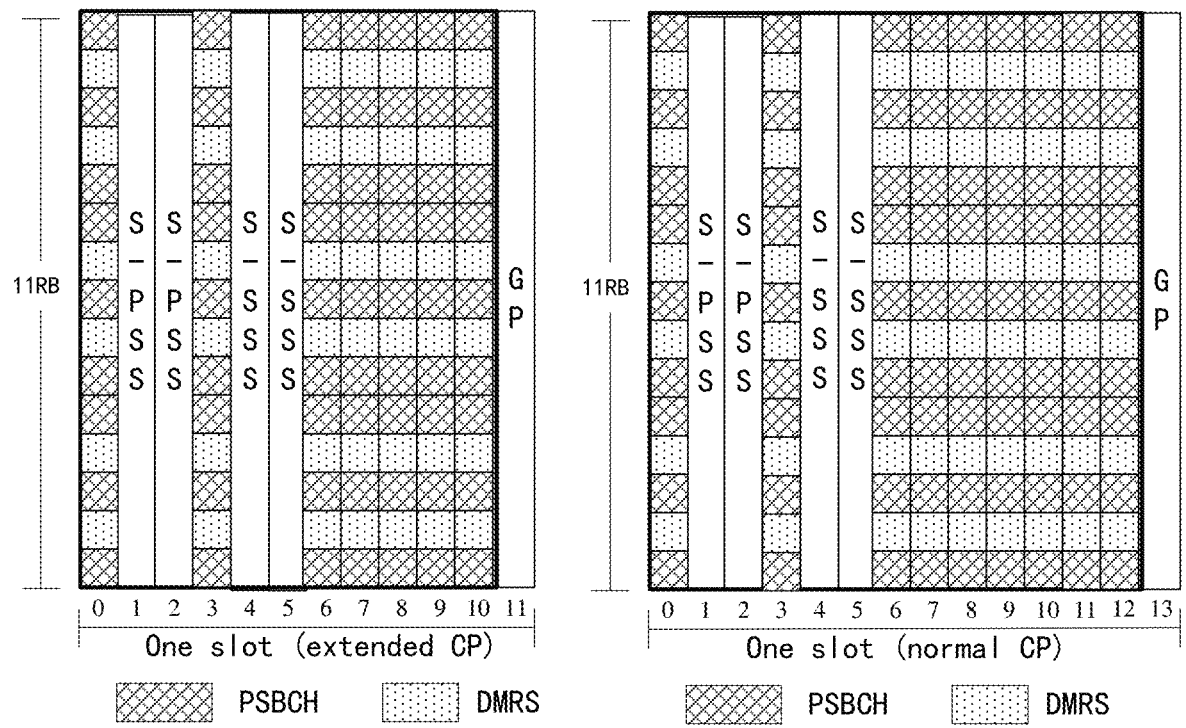
FIG. 12 is a schematic structural diagram of an S-SSB according to embodiment 8 of the disclosure.

FIG. 12 is a schematic structural diagram of an S-SSB in embodiment 8. As shown in the figure, when a CP-OFDM waveform is used, one slot configured with extended CP includes one S-SSB, and S-PSS is located in symbols #1 and #2, S-SSS is located in symbols #4 and #5, PSBCH is located in symbols #0, #3, and #6 to #10, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols. The use of extended CP can ensure that the coverage requirement of NR V2X is met, and the PSBCH at symbol #0 serves as AGC, which reduces the code rate of PSBCH and improves the decoding performance of PSBCH.

Moreover, two S-PSS symbols are followed by PSBCH, which avoids the impact of transition time on S-SSS detection.

Embodiment 9

Figure 13:
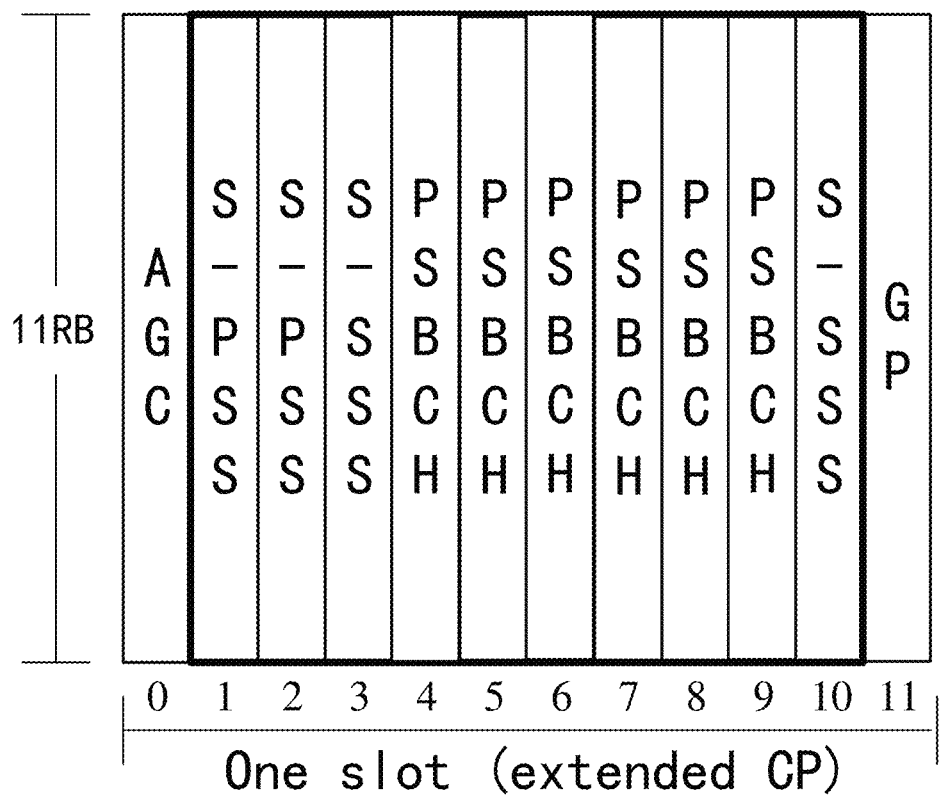
FIG. 13 is a schematic structural diagram of an S-SSB according to embodiment 9 of the disclosure.

FIG. 13 is a schematic structural diagram of an S-SSB in embodiment 9. As shown in the figure, when a CP-OFDM waveform or DFT-s-OFDM waveform is used, one slot configured with extended CP includes one S-SSB, and S-PSS is located in symbols #1 and #2, S-SSS is located in symbols #3 and #10, PSBCH is located in symbols #4 to #9, and the symbols where PSBCH is located do not include a DMRS. S-SSS is used for channel estimation, and the channel estimate is used for PSBCH decoding. Moreover, two symbols in which S-SSS is sent repetitively are separated by six symbols in the time domain. The S-SSB pattern in the slot configured with normal CP is different from the S-SSB pattern in the slot configured with extended CP, and the PSBCH of the S-SSB in the slot configured with normal CP occupies two more symbols.

In this configuration, both S-PSS and S-SSS are sent using two symbols, and the two symbols for transmission of S-SSS are separated by 6 symbols in the time domain, which can improve the performance of frequency offset estimation, and further decrease the decoding BLER of the PSBCH. In addition, since the S-SSB pattern does not include any DMRS, it can be applied to both the CP-OFDM waveform and the DFT-s-OFDM waveform.

Embodiment 10

Figure 14:
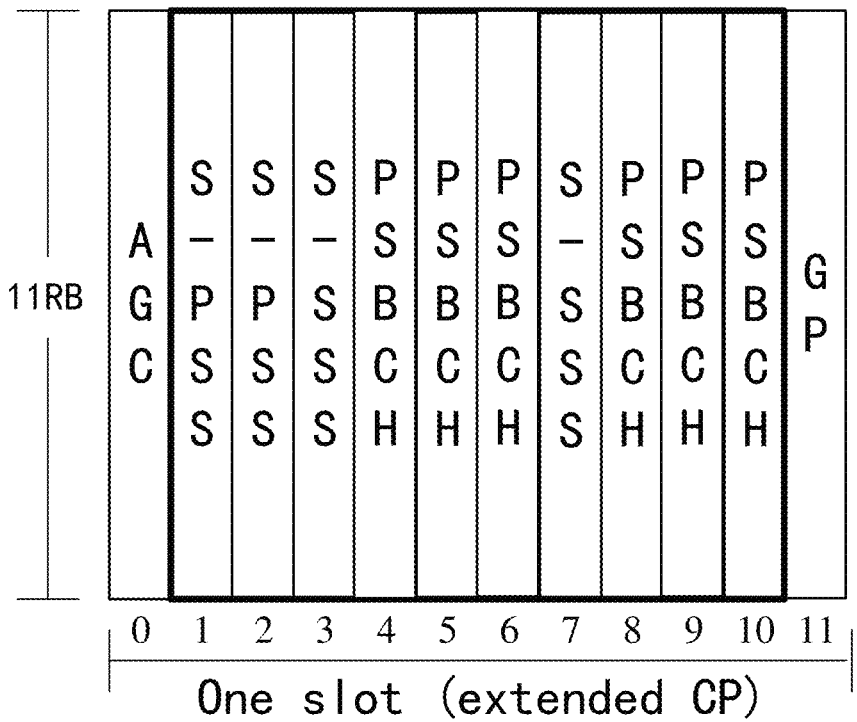
FIG. 14 is a schematic structural diagram of an S-SSB according to embodiment 10 of the disclosure.

FIG. 14 is a schematic structural diagram of an S-SSB in embodiment 10. As shown in the figure, when a CP-OFDM waveform or DFT-s-OFDM waveform is used, one slot configured with extended CP includes one S-SSB, and S-PSS is located in symbols #1 and #2, S-SSS is located in symbols #3 and #7, PSBCH is located in symbols #4 to #6, #8 and #10. The DMRS is not included in the symbols where the PSBCH is located, and S-SSS is used for channel estimation, and the channel estimate is used for PSBCH decoding. Moreover, two symbols in which S-SSS is sent repetitively are separated by 3 symbols in the time domain. The S-SSB pattern in the slot configured with normal CP is different from the S-SSB pattern in the slot configured with extended CP, and the PSBCH of the S-SSB in the slot configured with normal CP occupies two more symbols.

In this configuration, both S-PSS and S-SSS are sent using two symbols, and the two symbols for transmission of S-SSS are separated by 3 symbols in the time domain, which can improve the performance of frequency offset estimation, and further decrease the decoding BLER of the PSBCH. In addition, since the S-SSB pattern does not include any DMRS, it can be applied to both the CP-OFDM waveform and the DFT-s-OFDM waveform.

Embodiment 11

Figure 15:
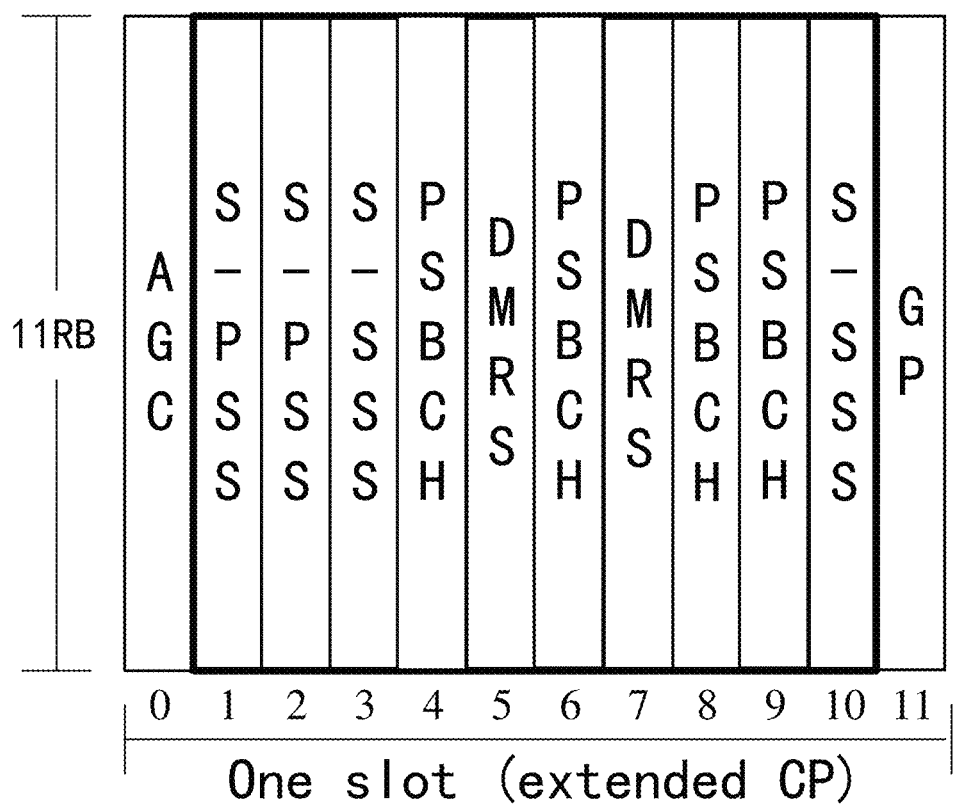
FIG. 15 is a schematic structural diagram of an S-SSB according to embodiment 11 of the disclosure.

FIG. 15 is a schematic structural diagram of an S-SSB in embodiment 11. As shown in the figure, when a DFT-s-OFDM waveform is used, one slot configured with extended CP includes one S-SSB, and S-PSS is located in symbols #1 and #2, S-SSS is located in symbols #3 and #10, PSBCH is located in symbols #4, #6, #8 and #10, and DMRS is located in symbols #5 and #7. DMRS and S-SSS are used for channel estimation, and the channel estimate is used for PSBCH decoding. Two symbols in which S-SSS is sent repetitively are separated by 6 symbols in the time domain. The S-SSB pattern in the slot configured with normal CP is different from the S-SSB pattern in the slot configured with extended CP, and the PSBCH of the S-SSB in the slot configured with normal CP occupies two more symbols.

In this configuration, both S-PSS and S-SSS are sent using two symbols, and the two symbols for transmission of S-SSS are separated by 6 symbols in the time domain, which can improve the performance of frequency offset estimation, and further decrease the decoding BLER of the PSBCH.

Embodiment 12

Figure 16:
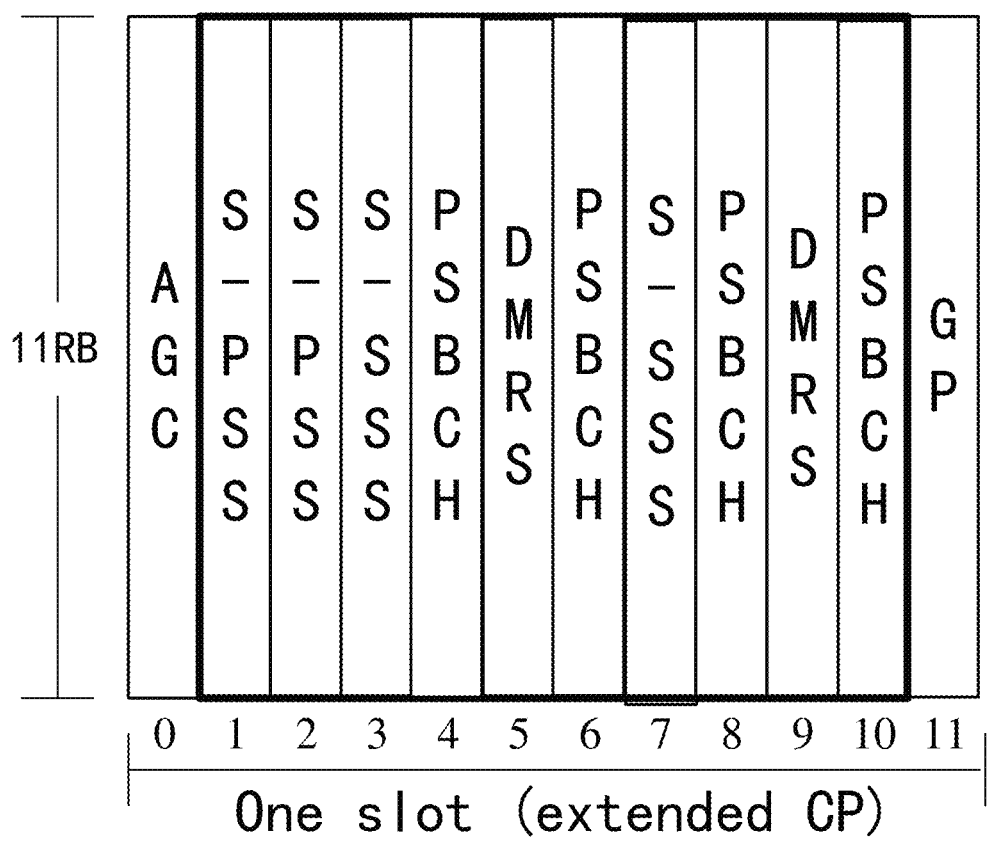
FIG. 16 is a schematic structural diagram of an S-SSB according to embodiment 12 of the disclosure.

FIG. 16 is a schematic structural diagram of an S-SSB in embodiment 12. As shown in the figure, when a DFT-s-OFDM waveform is used, one slot configured with extended CP includes one S-SSB, and S-PSS is located in symbols #1 and #2, S-SSS is located in symbols #3 and #7, PSBCH is located in symbols #4, #6, #8 and #10, and DMRS is located in symbols #5 and #9. DMRS and S-SSS are used for channel estimation, and the channel estimate is used for PSBCH decoding. Two symbols in which S-SSS is sent repetitively are separated by 3 symbols in the time domain. The S-SSB pattern in the slot configured with normal CP is different from the S-SSB pattern in the slot configured with extended CP, and the PSBCH of the S-SSB in the slot configured with normal CP occupies two more symbols.

In this configuration, both S-PSS and S-SSS are sent using two symbols, and the two symbols for transmission of S-SSS are separated by 3 symbols in the time domain, which can improve the performance of frequency offset estimation, and further decrease the decoding BLER of the PSBCH.

Embodiment 13

Figure 17:
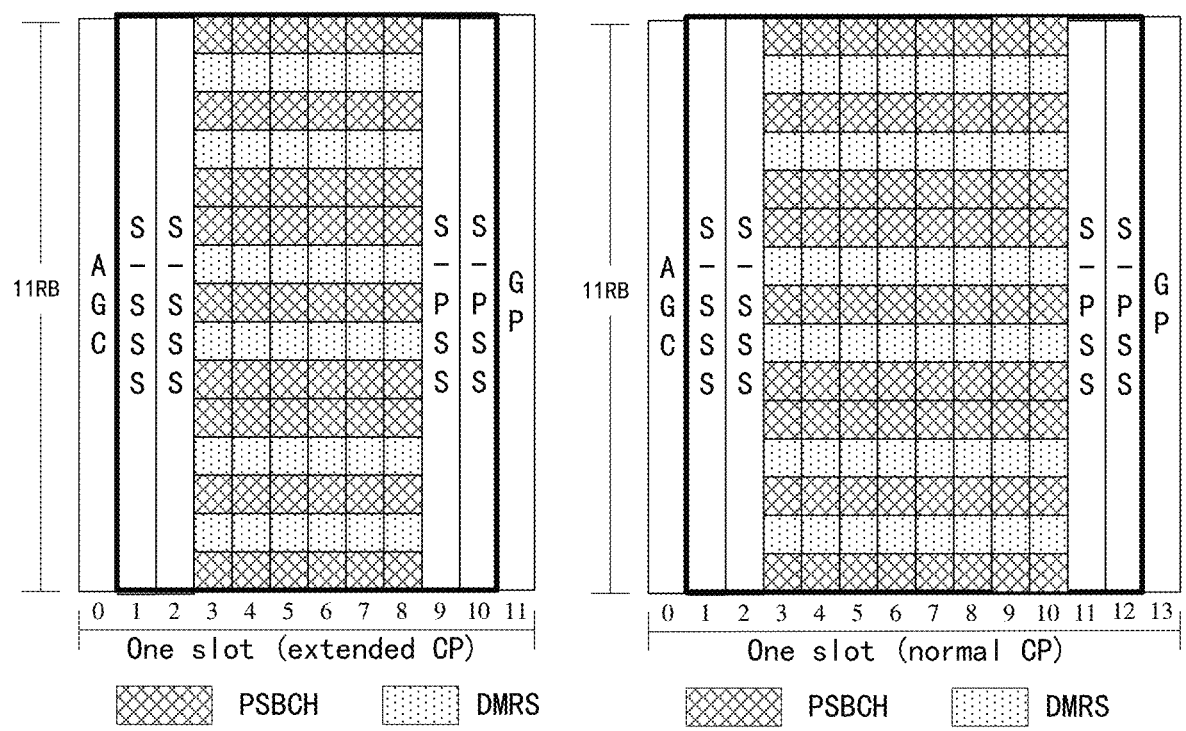
FIG. 17 is a schematic structural diagram of an S-SSB according to embodiment 13 of the disclosure.

FIG. 17 is a schematic structural diagram of an S-SSB in embodiment 13. As shown in the figure, when a CP-OFDM waveform is used, one slot configured with extended CP includes one S-SSB, and S-PSS is located in symbols #1 and #2, S-SSS is located in symbols #9 and #10, PSBCH is located in symbols #3 to #10, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols. The use of extended CP can ensure that the coverage requirement of NR V2X is met, and two S-PSS symbols are followed by PSBCH, which avoids the impact of transition time on S-SSS detection.

Embodiment 14

Figure 18:
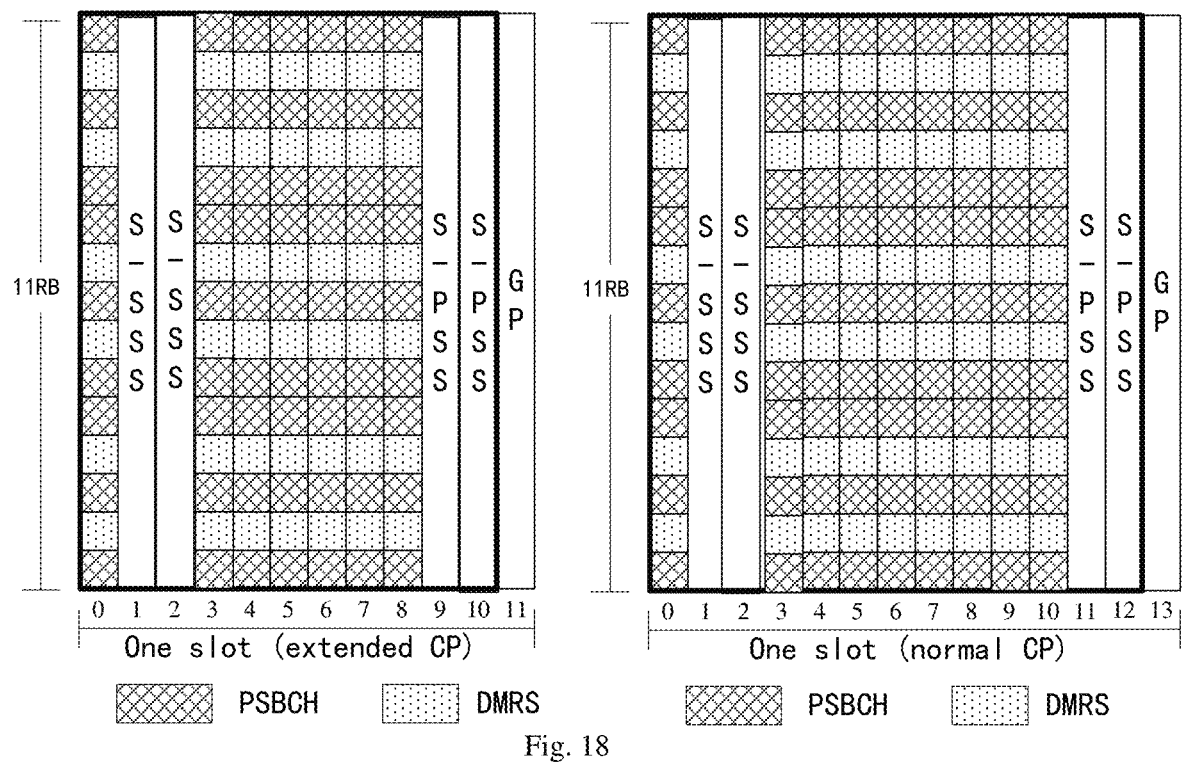
FIG. 18 is a schematic structural diagram of an S-SSB according to embodiment 14 of the present disclosure.

FIG. 18 is a schematic structural diagram of an S-SSB in embodiment 14. As shown in the figure, when a CP-OFDM waveform is used, one slot configured with extended CP includes one S-SSB, and S-PSS is located in symbols #1 and #2, S-SSS is located in symbols #9 and #10, PSBCH is located in symbols #0, and #3 to #8, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols. The use of extended CP can ensure that the coverage requirement of NR V2X is met, and the PSBCH at symbol #0 serves as AGC, which reduces the code rate of PSBCH and improves the decoding performance of PSBCH. Moreover, two S-PSS symbols are followed by PSBCH, which avoids the impact of transition time on S-SSS detection.

Embodiment 15

Figure 19:
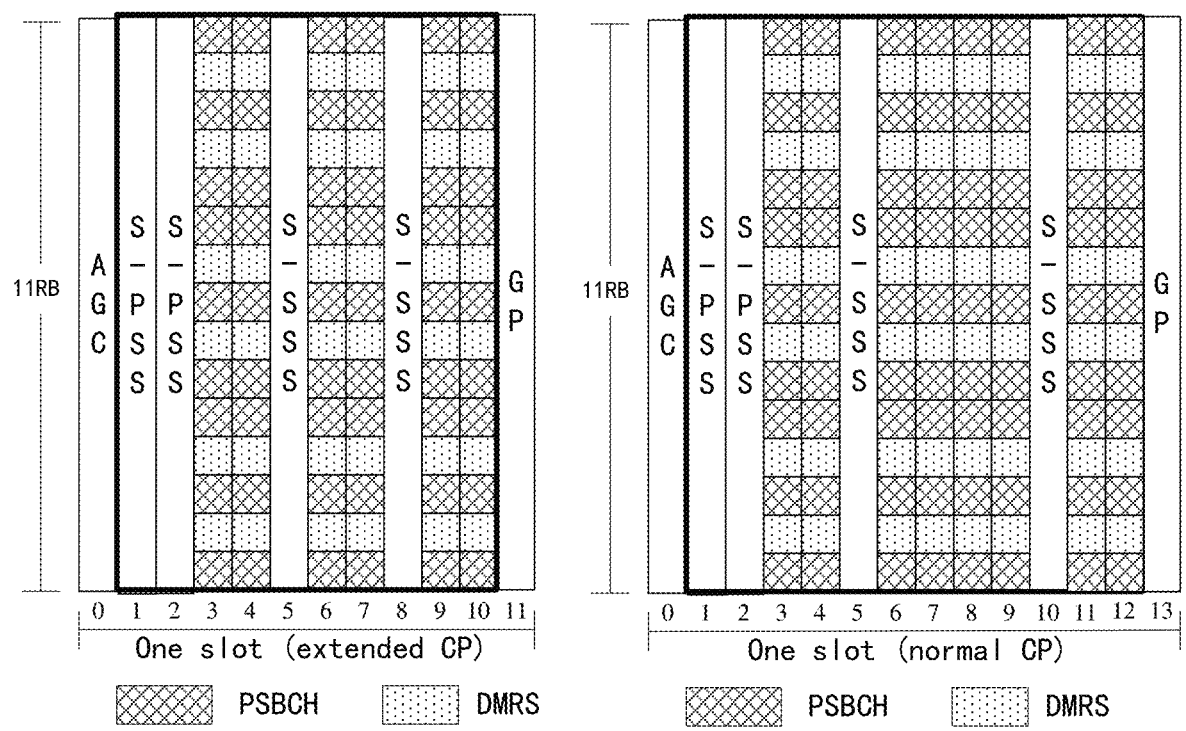
FIG. 19 is a schematic structural diagram of an S-SSB according to embodiment 15 of the disclosure.

FIG. 19 is a schematic structural diagram of an S-SSB in embodiment 15. As shown in the figure, when a CP-OFDM waveform is used, one slot configured with extended CP includes one S-SSB, and S-PSS is located in symbols #1 and #2, S-SSS is located in symbols #5 and #8, PSBCH is located in symbols #3, #4, #6, #7, #9 and #10, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols. The use of extended CP can ensure that the coverage requirement of NR V2X is met. Moreover, two S-PSS symbols are followed by PSBCH, which avoids the impact of transition time on S-SSS detection.

Embodiment 16

Figure 20:
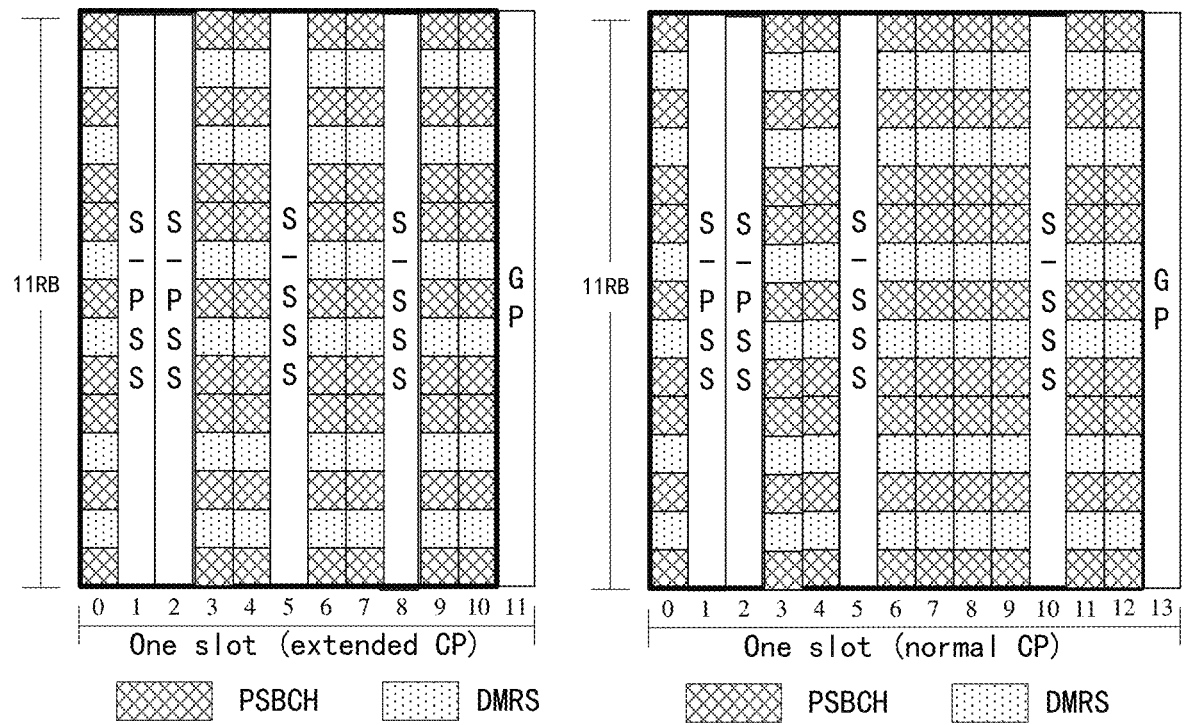
FIG. 20 is a schematic structural diagram of an S-SSB according to embodiment 16 of the disclosure.

FIG. 20 is a schematic structural diagram of an S-SSB in embodiment 16. As shown in the figure, when a CP-OFDM waveform is used, one slot configured with extended CP includes one S-SSB, and S-PSS is located in symbols #1 and #2, S-SSS is located in symbols #5 and #8, PSBCH is located in symbols #0, #3, #4, #6, #7, #9 and #10, and all the symbols where PSBCH is located have a DMRS embedded in a comb-like manner. DMRS and S-SSS are used for channel estimation, and the channel estimate is used for PSBCH decoding. The S-SSB pattern in the slot configured with normal CP is different from the S-SSB pattern in the slot configured with extended CP, and the PSBCH of the S-SSB in the slot configured with normal CP occupies two more symbols.

In this configuration, an extended CP is used to transmit S-SSB, and both S-PSS and S-SSS are sent using two symbols. The use of extended CP can ensure that the coverage requirement of NR V2X is met, and the PSBCH at symbol #0 serves as AGC, which reduces the code rate of PSBCH and improves the decoding performance of PSBCH. Moreover, two S-PSS symbols are followed by PSBCH, which avoids the impact of transition time on S-SSS detection. The disadvantage is that S-PSS and S-SSS each occupy two symbols, and the resource overhead is relatively large.

Embodiment 17

Figure 21:
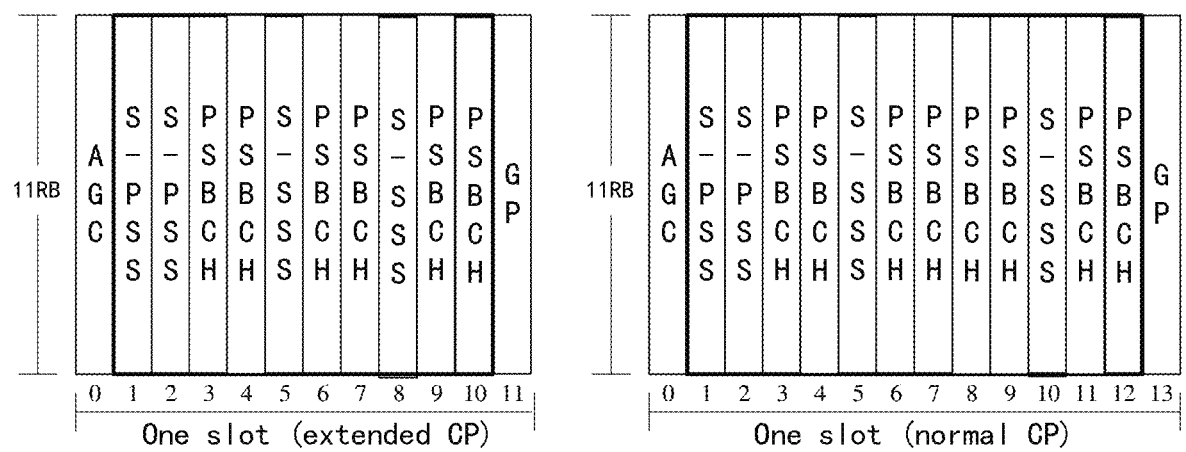
FIG. 21 is a schematic structural diagram of an S-SSB according to embodiment 17 of the disclosure.

FIG. 21 is a schematic structural diagram of an S-SSB in embodiment 17. As shown in the figure, when a CP-OFDM waveform or DFT-s-OFDM waveform is used, one slot configured with extended CP includes one S-SSB, and S-PSS is located in symbols #1 and #2, S-SSS is located in symbols #5 and #8, PSBCH is located in symbols #3, #4, #6, #7, #9 and #10. The DMRS is not included in the symbols where the PSBCH is located, and S-SSS is used for channel estimation, and the channel estimate is used for PSBCH decoding. Moreover, two symbols in which S-SSS is sent repetitively are separated by 2 symbols in the time domain. The S-SSB pattern in the slot configured with normal CP is different from the S-SSB pattern in the slot configured with extended CP, and the PSBCH of the S-SSB in the slot configured with normal CP occupies two more symbols.

In this configuration, both S-PSS and S-SSS are sent using two symbols, and the two symbols for transmission of S-SSS are separated by 2 symbols in the time domain, which can improve the performance of frequency offset estimation, and further decrease the decoding BLER of the PSBCH. In addition, since the S-SSB pattern does not include any DMRS, it can be applied to both the CP-OFDM waveform and the DFT-s-OFDM waveform. Moreover, two S-PSS symbols are followed by PSBCH, which avoids the impact of transition time on S-SSS detection.

Embodiment 18

Figure 22:
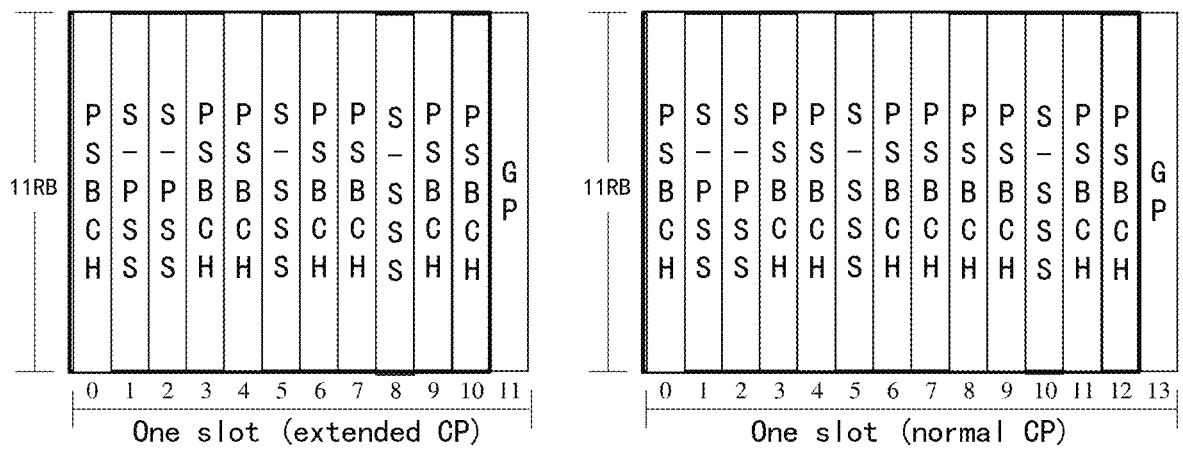
FIG. 22 is a schematic structural diagram of an S-SSB according to embodiment 18 of the disclosure.

FIG. 22 is a schematic structural diagram of an S-SSB in embodiment 18. As shown in the figure, when a CP-OFDM waveform or DFT-s-OFDM waveform is used, one slot configured with extended CP includes one S-SSB, and S-PSS is located in symbols #1 and #2, S-SSS is located in symbols #5 and #8, PSBCH is located in symbols #0, #3, #4, #6, #7, #9 and #10. The DMRS is not included in the symbols where the PSBCH is located, and S-SSS is used for channel estimation, and the channel estimate is used for PSBCH decoding. Moreover, two symbols in which S-SSS is sent repetitively are separated by 2 symbols in the time domain. The S-SSB pattern in the slot configured with normal CP is different from the S-SSB pattern in the slot configured with extended CP, and the PSBCH of the S-SSB in the slot configured with normal CP occupies two more symbols.

In this configuration, both S-PSS and S-SSS are sent using two symbols, and the two symbols for transmission of S-SSS are separated by 2 symbols in the time domain, which can improve the performance of frequency offset estimation, and further decrease the decoding BLER of the PSBCH. The PSBCH at symbol #0 serves as AGC, which reduces the code rate of PSBCH and improves the decoding performance of PSBCH. In addition, since the S-SSB pattern does not include any DMRS, it can be applied to both the CP-OFDM waveform and the DFT-s-OFDM waveform. Moreover, two S-PSS symbols are followed by PSBCH, which avoids the impact of transition time on S-SSS detection.

Based on the same inventive concept, embodiments of the present disclosure also provide a terminal acting as a sending side, a terminal acting as a receiving side, a sending apparatus, a receiving apparatus, and a storage medium. Because the principles on which these devices are based to solve the problem is similar to those underlying the method for sending the signal and the method for receiving the signal, for the implementation of these devices, references can be made to the implementations of the methods, and a redundant description is omitted herein.

When the technical solutions provided in the embodiments of the present disclosure are implemented, the solutions can be implemented as follows.

Figure 23:
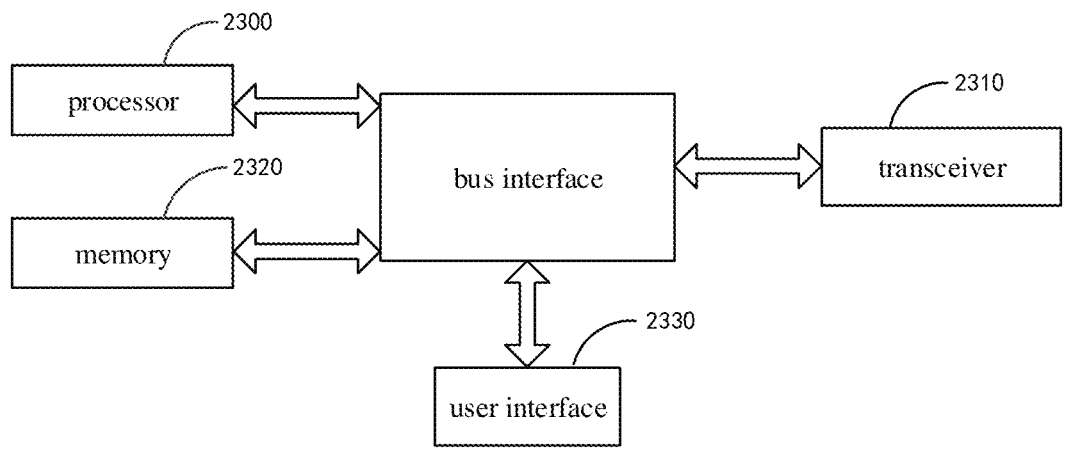
FIG. 23 is a schematic structural diagram of a terminal serving as a sending side according to an embodiment of the disclosure.

FIG. 23 is a schematic structural diagram of a terminal acting as a sending side. As shown in FIG. 23, the terminal includes:
- a processor 2300, configured to read a program in a memory 2320 and execute following process:
- sending an SSB, wherein the SSB includes a PSS, an SSS and a PBCH, the PSS occupying two OFDM symbols, the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern;
- a transceiver 2310, configured to receive and send data under the control of the processor 2300.

In an implementation, that the first SSB pattern is different from the second SSB pattern refers to that:
- the PBCH in the SSB occupies M OFDM symbols when the SSB is sent by using the extended CP; or,
- the PBCH in the SSB occupies N OFDM symbols when the SSB is sent by using the normal CP;
- wherein M is not equal to N.

In an implementation, M is 6 or 7; or, N is 8 or 9.

In an implementation, two OFDM symbols in the SSB that are used for transmission of the SSS are discontinuous OFDM symbols in a time domain.

In an implementation, the SSB further includes the PBCH occupying 5 or more OFDM symbols.

In an implementation, the first OFDM symbol of the slot where the SSB is located is allocated for the PBCH, and the first OFDM symbol is used for implementing the AGC function.

In an implementation, a channel estimation is performed by using a DMRS embedded in the PBCH and PBCH decoding is performed based on a result of the channel estimation when the SSB is sent by using a CP-OFDM waveform; or,
- the channel estimation is performed by using the SSS and the PBCH decoding is performed based on the result of the channel estimation when the SSB is sent by using the CP-OFDM waveform; or,
- the channel estimation is performed by using the SSS and the PBCH decoding is performed based on the result of the channel estimation when the SSB is sent by using a DFT-s-OFDM waveform; or
- the channel estimation is performed by using the DMRS and the PBCH decoding is performed based on the result of the channel estimation when the SSB is sent by using the DFT-s-OFDM waveform.

In an implementation, the SSB is an S-SSB, the PSS is an S-PSS, the SSS is an S-SSS, and the PBCH is a PSBCH.

In FIG. 23, the bus architecture may include any number of interconnected buses and bridges, and connect various circuits including one or more processors represented specifically by the processor 2300 and a memory represented by the memory 2320. The bus architecture can also connect various other circuits such as peripheral devices, voltage regulators, power management circuits, etc., which are all known in the field, and therefore, will not be further described herein. The bus interface provides the interface. The transceiver 2310 may be a plurality of elements, that is, including a transmitter and a receiver, and provide a unit for communicating with various other devices on the transmission medium. For different user equipment, the user interface 2330 may also be an interface capable of connecting externally and internally with required device. The connected device includes but is not limited to a keypad, a display, a speaker, a microphone, a joystick, etc.

The processor 2300 is responsible for managing the bus architecture and general processing, and the memory 2320 can store data used by the processor 2300 when performing operations.

Figure 24:
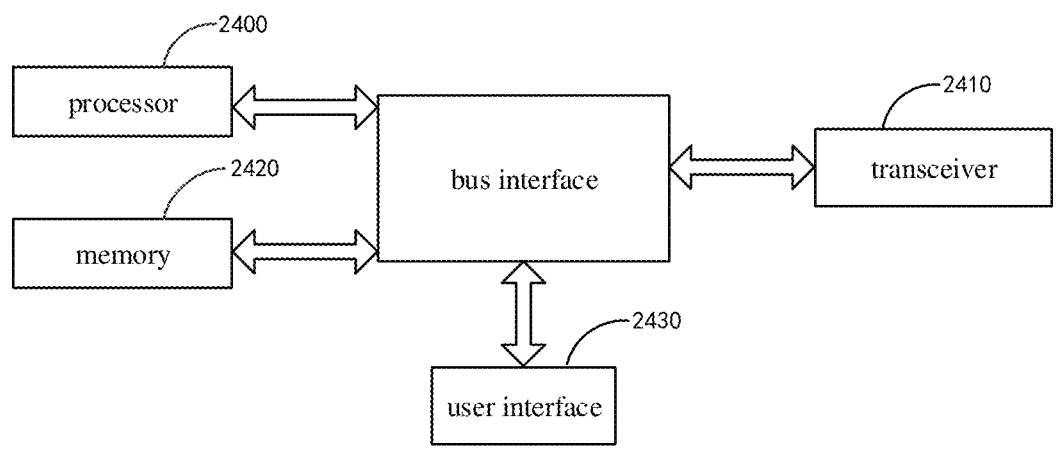
FIG. 24 is a schematic structural diagram of a terminal serving as a receiving side according to an embodiment of the disclosure.

FIG. 24 is a schematic structural diagram of a terminal acting as a receiving side. As shown in FIG. 24, the terminal includes:
- a processor 2400, configured to read a program in a memory 2420 and execute following process:
- demodulating an SSB;
- a transceiver 2410, configured to receive and send data under the control of the processor 2400 and execute following process:
- receiving the SSB, wherein the SSB includes a PSS, an SSS and a PBCH, the PSS occupying two OFDM symbols, the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern.

In an implementation, that the first SSB pattern is different from the second SSB pattern refers to that:
- the PBCH in the SSB occupies M OFDM symbols when the SSB is sent by using the extended CP; or,
- the PBCH in the SSB occupies N OFDM symbols when the SSB is sent by using the normal CP;
- wherein M is not equal to N.

In an implementation, M is 6 or 7; or, N is 8 or 9.

In an implementation, two OFDM symbols in the SSB that are used for transmission of the SSS are discontinuous OFDM symbols in a time domain.

In an implementation, the SSB further includes the PBCH occupying 5 or more OFDM symbols.

In an implementation, the first OFDM symbol of the slot where the SSB is located is allocated for the PBCH, and the first OFDM symbol is used for implementing the AGC function.

In an implementation, a channel estimation is performed by using a DMRS embedded in the PBCH and PBCH decoding is performed based on a result of the channel estimation when the SSB is sent by using a CP-OFDM waveform; or,
- the channel estimation is performed by using the SSS and the PBCH decoding is performed based on the result of the channel estimation when the SSB is sent by using the CP-OFDM waveform; or,
- the channel estimation is performed by using the SSS and the PBCH decoding is performed based on the result of the channel estimation when the SSB is sent by using a DFT-s-OFDM waveform; or
- the channel estimation is performed by using the DMRS and the PBCH decoding is performed based on the result of the channel estimation when the SSB is sent by using the DFT-s-OFDM waveform.

In an implementation, the SSB is an S-SSB, the PSS is an S-PSS, the SSS is an S-SSS, and the PBCH is a PSBCH.

In FIG. 24, the bus architecture may include any number of interconnected buses and bridges, and connect various circuits including one or more processors represented specifically by the processor 2400 and a memory represented by the memory 2420. The bus architecture can also connect various other circuits such as peripheral devices, voltage regulators, power management circuits, etc., which are all known in the field, and therefore, will not be further described herein. The bus interface provides the interface. The transceiver 2410 may be a plurality of elements, that is, including a transmitter and a receiver, and provide a unit for communicating with various other devices on the transmission medium. For different user equipment, the user interface 2430 may also be an interface capable of connecting externally and internally with required device. The connected device includes but is not limited to a keypad, a display, a speaker, a microphone, a joystick, etc.

The processor 2400 is responsible for managing the bus architecture and general processing, and the memory 2420 can store data used by the processor 2400 when performing operations.

An embodiment of the present disclosure provides an apparatus for sending a signal, including: a sending module, configured to send an SSB, wherein the SSB includes a PSS, an SSS and a PBCH, the PSS occupying two OFDM symbols, and the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern.

For the specific implementation thereof, references can be made to the implementations of the method for sending a signal, and a redundant description is omitted herein.

An embodiment of the present disclosure provides an apparatus for receiving a signal, including: a receiving module, configured to receive an SSB, wherein the SSB includes a PSS, an SSS and a PBCH, the PSS occupying two OFDM symbols, and the SSS occupying two OFDM symbols, wherein an SSB pattern used in a slot where the SSB is located is a first SSB pattern when a normal CP is configured, the SSB pattern used in the slot where the SSB is located is a second SSB pattern when an extended CP is configured, and the first SSB pattern is different from the second SSB pattern; a demodulation module, configured to demodulate the SSB.

For the specific implementation thereof, references can be made to the implementations of the method for receiving a signal, and a redundant description is omitted herein.

For the convenience of description, parts of the above-mentioned apparatuses are divided according to function into various modules or units and are described separately. Of course, when the present disclosure is implemented, the functions of the various modules or units can be implemented in one or more pieces of software or hardware.

An embodiment of the present disclosure provides a computer-readable storage medium storing thereon a computer program, wherein the computer program is configured to be executed by a processor to implement the above-mentioned method for sending a signal and/or method for receiving a signal.

For the specific implementation thereof, references can be made to the implementations of the method for sending a signal and/or the method for receiving a signal, and a redundant description is omitted herein.

In summary, the embodiments of the present disclosure provide a technical solution for sending and receiving a signal, and this technical solution can be used in NR V2X sidelink communication. In the solution, the SSB pattern used in the case of normal CP is different from the SSB pattern used in the case of extended CP. Moreover, in the SSB, two OFDM symbols are used to transmit the PSS, while two OFDM symbols are used to transmit the SSS.

The following is further provided.

The difference between the SSB patterns in the cases of normal CP and extended CP lies in that the quantity of symbols occupied by PBCH is different; specifically, PBCH occupies 8 or 9 symbols in the case of normal CP, while PBCH occupies 6 or 7 symbols in the case of extended CP.

In the SSB pattern, two discontinuous OFDM symbols are used for transmission of the SSS.

In the SSB pattern, the PBCH occupies at least 5 OFDM symbols.

In the SSB pattern, the first symbol is allocated for PBCH to implement the AGC function.

When a CP-OFDM waveform is used, an independent DMRS column is not included, instead, a DMRS embedded in the PBCH is used for channel estimation, and PBCH decoding is performed based on a result of the channel estimation.

When a CP-OFDM or DFT-s-OFDM waveform is used, the symbols where the PBCH is located do not include the embedded DMRS, instead, the channel estimation is performed by using the SSS, and PBCH decoding is performed based on a result of the channel estimation. Here, the two waveforms can share a single SSB pattern.

When a DFT-s-OFDM waveform is used, an independent DMRS column is used for channel estimation, and the channel estimate is used for PBCH decoding.

With the technical solution provided in the embodiments of the present disclosure, an SSB pattern for the situation where an extended CP is used may be utilized when the sidelink communication subcarrier spacing is large, to avoid inter-symbol crosstalk due to multipath delay, thus improving the success rate of detecting PSS and SSS sequences, and further improving the success rate of decoding the PBCH and ensuring that the coverage radius requirement of NR V2X is met.

It is appreciated by a person skilled in the art that, embodiments of the present disclosure may be implemented as a method, system or computer program product. Therefore, embodiments of the present disclosure may take the form of a complete hardware embodiment, complete software embodiment or combination of hardware and software. Moreover, embodiments of the present disclosure may take the form of a computer program product embodied on one or more computer usable storage media (including, but not limited to, a magnetic disk storage, optical storage or the like) storing therein computer usable program codes.

The embodiments of the present disclosure have been described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which are executed by the processor of the computer or other programmable data processing device, create means for implementing the functions specified in one or more flows of the flow diagrams and/or one or more blocks of the block diagrams.

These computer program instructions may also be stored in a computer-readable storage that can direct a computer or other programmable data processing device to function in a particular manner, such that the instructions stored in the computer-readable storage produce an article of manufacture including instruction means which implement the function specified in one or more flows of the flow diagrams and/or one or more blocks of the block diagrams.

The computer program instructions may also be loaded onto a computer or other programmable data processing device to cause a series of operational steps to be performed on the computer or other programmable device to produce a computer-implemented process, such that the instructions which are executed on the computer or other programmable device provide steps for implementing the functions specified in one or more flows of the flow diagrams and/or one or more blocks of the block diagrams.

It should be noted that the above division of various modules is only a logical functional division, and during actual implementation, the various modules can be fully or partially integrated into a physical entity, or physically separated. These modules can all be implemented in the form of software invoked by processing elements; these modules can also all be implemented in the form of hardware; or they can also be partially implemented in the form of software invoked by processing elements and partially implemented in the form of hardware. For example, a determination module can be a separately provided processing element or can be integrated in certain chip of the above-mentioned device, in addition, it can also be stored in the memory of the above-mentioned device in the form of program code, which is invoked by certain processing element of the above-mentioned device to perform the functions of the above-mentioned determination module. Other modules are implemented in a similar way. Furthermore, all or some of these modules can be integrated together or can be implemented independently. The processing element described here may be an integrated circuit with signal processing capabilities. During implementation, the various steps of the above-mentioned methods or the above-mentioned modules may be accomplished by integrated logic circuits in the form of hardware or by instructions in the form of software in the processor element.

For example, the various modules, units, subunits, or submodules may be one or more integrated circuits configured to implement the above method, e.g., one or more application specific integrated circuits (ASICs), or, one or more digital signal processors (DSPs), or, one or more field programmable gate arrays (FPGAs), etc. Further, when one of the above modules is implemented in the form of program code invoked by a processing element, the processing element may be a general purpose processor, such as a central processing unit (CPU) or other processor that can invoke program code. Further, these modules may be integrated together and implemented in the form of a system-on-a-chip (SOC).

Terms "first", "second" and the like in the specification and claims of this disclosure are adopted not to describe a specific sequence or order but to distinguish similar objects. It should be understood that data used like this may be interchanged under a proper condition for implementation of the embodiments of the disclosure described here in a sequence apart from those shown or described here. In addition, terms "include" and "have" and any variant thereof are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment. In addition, "and/or" in the specification and claims is used to indicate at least one of the connected objects, for example, A and/or B and/or C indicates seven cases as follows: A alone, B alone, C alone, A and B both present, B and C both present, A and C both present, and A, B, and C all present. Similarly, the use of "at least one of A or B" in this specification and in the claims should be understood to mean "A alone, B alone, or A and B both present".

Obviously, for a person skilled in the art, several modifications and variants can be made without departing from the spirit and scope of the present disclosure. Thus, in the case that these modifications and variants fall within the scope of the claims and equivalents thereof, the present disclosure is also intended to encompass these modifications and variants.

What is claimed is:

1. A method for sending a signal, comprising:
   sending a synchronization signal block (SSB), wherein the SSB comprises a primary synchronization signal (PSS), a secondary synchronization signal (SSS) and a physical broadcast channel (PBCH), the PSS occupying two orthogonal frequency division multiplexing (OFDM) symbols, and the SSS occupying two OFDM symbols, wherein an SSB pattern used in a slot where the SSB is located is a first SSB pattern when a normal cyclic prefix (CP) is configured, the SSB pattern used in the slot where the SSB is located is a second SSB pattern when an extended CP is configured, and the first SSB pattern is different from the second SSB pattern;
   wherein that the first SSB pattern is different from the second SSB pattern refers to that:
   the PBCH in the SSB occupies M OFDM symbols when the SSB is sent by using the extended CP; or,
   the PBCH in the SSB occupies N OFDM symbols when the SSB is sent by using the normal CP;
   wherein M is not equal to N.

2. The method according to claim 1, wherein M is 6 or 7; or, N is 8 or 9.

3. The method according to claim 1, wherein two OFDM symbols in the SSB that are used for transmission of the SSS are discontinuous OFDM symbols in a time domain;
   and/or,
   wherein the SSB further comprises the PBCH occupying 5 or more OFDM symbols;
   and/or,
   wherein a first OFDM symbol of the slot where the SSB is located is allocated for the PBCH, and is used for implementing an automatic gain control (AGC) function.

4. The method according to claim 1, wherein, a channel estimation is performed by using a demodulation reference signal (DMRS) embedded in the PBCH and PBCH decoding is performed based on a result of the channel estimation when the SSB is sent by using a cyclic prefix-orthogonal frequency division multiplexing (CP-OFDM) waveform; or,
   the channel estimation is performed by using the SSS and the PBCH decoding is performed based on the result of the channel estimation when the SSB is sent by using the CP-OFDM waveform; or,
   the channel estimation is performed by using the SSS and the PBCH decoding is performed based on the result of the channel estimation when the SSB is sent by using a discrete Fourier transform-spread-orthogonal frequency division multiplexing (DFT-s-OFDM) waveform; or the channel estimation is performed by using the DMRS and the PBCH decoding is performed based on the result of the channel estimation when the SSB is sent by using the DFT-s-OFDM waveform.

5. The method according to claim 1, wherein the SSB is a sidelink synchronization signal block (S-SSB), the PSS is a sidelink primary synchronization signal (S-PSS), the SSS is a sidelink secondary synchronization signal (S-SSS), and the PBCH is a physical sidelink broadcast channel (PSBCH).

6. A method for receiving a signal, comprising:
receiving a synchronization signal block (SSB), wherein the SSB comprises a primary synchronization signal (PSS), a secondary synchronization signal (SSS) and a physical broadcast channel (PBCH), the PSS occupying two orthogonal frequency division multiplexing (OFDM) symbols, the SSS occupying two OFDM symbols, wherein an SSB pattern used in a slot where the SSB is located is a first SSB pattern when a normal cyclic prefix (CP) is configured, the SSB pattern used in the slot where the SSB is located is a second SSB pattern when an extended CP is configured, and the first SSB pattern is different from the second SSB pattern;
demodulating the SSB;
wherein that the first SSB pattern is different from the second SSB pattern refers to that:
the PBCH in the SSB occupies M OFDM symbols when the SSB is sent by using the extended CP; or,
the PBCH in the SSB occupies N OFDM symbols when the SSB is sent by using the normal CP;
wherein M is not equal to N.

7. The method according to claim 6, wherein M is 6 or 7; or, N is 8 or 9.

8. The method according to claim 6, wherein the SSB comprises at least one or more of the following:
two OFDM symbols in the SSB that are used for transmission of the SSS are discontinuous OFDM symbols in a time domain;
the SSB comprises the PBCH occupying 5 or more OFDM symbols;
a first OFDM symbol of the slot where the SSB is located is allocated for the PBCH, and is used for implementing an automatic gain control (AGC) function; or,
the SSB is a sidelink synchronization signal block (S-SSB), the PSS is a sidelink primary synchronization signal (S-PSS), the SSS is a sidelink secondary synchronization signal (S-SSS), and the PBCH is a physical sidelink broadcast channel (PSBCH).

9. A terminal, comprising:
a processor, configured to read a program in a memory and execute following process:
sending a synchronization signal block (SSB), wherein the SSB comprises a primary synchronization signal (PSS), a secondary synchronization signal (SSS) and a physical broadcast channel (PBCH), the PSS occupying two orthogonal frequency division multiplexing (OFDM) symbols, the SSS occupying two OFDM symbols, wherein an SSB pattern used in a slot where the SSB is located is a first SSB pattern when a normal cyclic prefix (CP) is configured, the SSB pattern used in the slot where the SSB is located is a second SSB pattern when an extended CP is configured, and the first SSB pattern is different from the second SSB pattern;
a transceiver, configured to receive and send data under the control of the processor;
wherein that the first SSB pattern is different from the second SSB pattern refers to that:
the PBCH in the SSB occupies M OFDM symbols when the SSB is sent by using the extended CP; or,
the PBCH in the SSB occupies N OFDM symbols when the SSB is sent by using the normal CP;
wherein M is not equal to N.

10. The terminal according to claim 9, wherein M is 6 or 7; or, N is 8 or 9.

11. The terminal according to claim 9, wherein the SSB comprises at least one or more of the following:
two OFDM symbols in the SSB that are used for transmission of the SSS are discontinuous OFDM symbols in a time domain;
the SSB comprises the PBCH occupying 5 or more OFDM symbols;
a first OFDM symbol of the slot where the SSB is located is allocated for the PBCH, and is used for implementing an automatic gain control (AGC) function; or,
the SSB is a sidelink synchronization signal block (S-SSB), the PSS is a sidelink primary synchronization signal (S-PSS), the SSS is a sidelink secondary synchronization signal (S-SSS), and the PBCH is a physical sidelink broadcast channel (PSBCH).

12. A terminal, comprising:
a processor, a memory and a transceiver, wherein the processor is configured to read a program in the memory to execute the steps of the method according to claim 6.

13. The terminal according to claim 12, wherein M is 6 or 7; or, N is 8 or 9.

14. The terminal according to claim 12, wherein the SSB comprises at least one or more of the following:
two OFDM symbols in the SSB that are used for transmission of the SSS are discontinuous OFDM symbols in a time domain;
the SSB comprises the PBCH occupying 5 or more OFDM symbols;
a first OFDM symbol of the slot where the SSB is located is allocated for the PBCH, and is used for implementing an automatic gain control (AGC) function; or,
the SSB is a sidelink synchronization signal block (S-SSB), the PSS is a sidelink primary synchronization signal (S-PSS), the SSS is a sidelink secondary synchronization signal (S-SSS), and the PBCH is a physical sidelink broadcast channel (PSBCH).

15. A non-transitory computer-readable storage medium storing thereon a computer program, wherein the computer program is configured to be executed by a processor to implement the steps of the method according to claim 1.

16. A non-transitory computer-readable storage medium storing thereon a computer program, wherein the computer program is configured to be executed by a processor to implement the steps of the method according to claim 9.

* * * * *